United States Patent
Burke

(10) Patent No.: US 8,025,217 B2
(45) Date of Patent: Sep. 27, 2011

(54) METHOD AND SYSTEM TO CREATE AND DISTRIBUTE EXCESS FUNDS FROM CONSUMER SPENDING TRANSACTIONS

(76) Inventor: Bertram V. Burke, Sarasota, FL (US)

( * ) Notice: Subject to any disclaimer, the term of this patent is extended or adjusted under 35 U.S.C. 154(b) by 143 days.

(21) Appl. No.: 12/462,691

(22) Filed: Aug. 8, 2009

(65) Prior Publication Data

US 2010/0299248 A1    Nov. 25, 2010

Related U.S. Application Data

(63) Continuation of application No. 11/421,113, filed on May 31, 2006, now Pat. No. 7,571,849.

(51) Int. Cl.
*G06F 9/00* (2006.01)
(52) U.S. Cl. .............................. 235/379; 235/380; 705/39
(58) Field of Classification Search .................. 235/379, 235/380; 705/14.1
See application file for complete search history.

(56) References Cited

U.S. PATENT DOCUMENTS

| | | | |
|---|---|---|---|
| 3,852,576 A * | 12/1974 | Rudd | 377/5 |
| 5,621,640 A * | 4/1997 | Burke | 705/14.17 |
| 6,088,682 A * | 7/2000 | Burke | 705/17 |
| 6,876,971 B1* | 4/2005 | Burke | 705/14.1 |
| 2003/0007615 A1* | 1/2003 | Parfait et al. | 379/114.2 |
| 2005/0051617 A1* | 3/2005 | Gorelick | 235/379 |
| 2005/0251485 A1* | 11/2005 | Quigley | 705/53 |
| 2007/0080213 A1* | 4/2007 | Workman et al. | 235/380 |

* cited by examiner

*Primary Examiner* — Daniel Hess
(74) *Attorney, Agent, or Firm* — Mark Terry

(57) ABSTRACT

The present invention provides a system for accumulating credits from a customer account belonging to the customer and managed by an institution and placing the credits into a provider account. The system includes an information processor including a data store with data identifying the customer, the rounding determinant, the managed institution, and the account. The data store includes data authorizing the processor to access and read the customer account and further includes data to calculate rounders after receiving a plurality of payment transactions from the read customer account and to calculate an excess based on the rounders. The data store also includes data to withdraw the excess from the customer account and data to transfer the withdrawn excess to the provider account.

4 Claims, 28 Drawing Sheets

TRANSACTION CARD

DC 1

MS

DC 2

BC

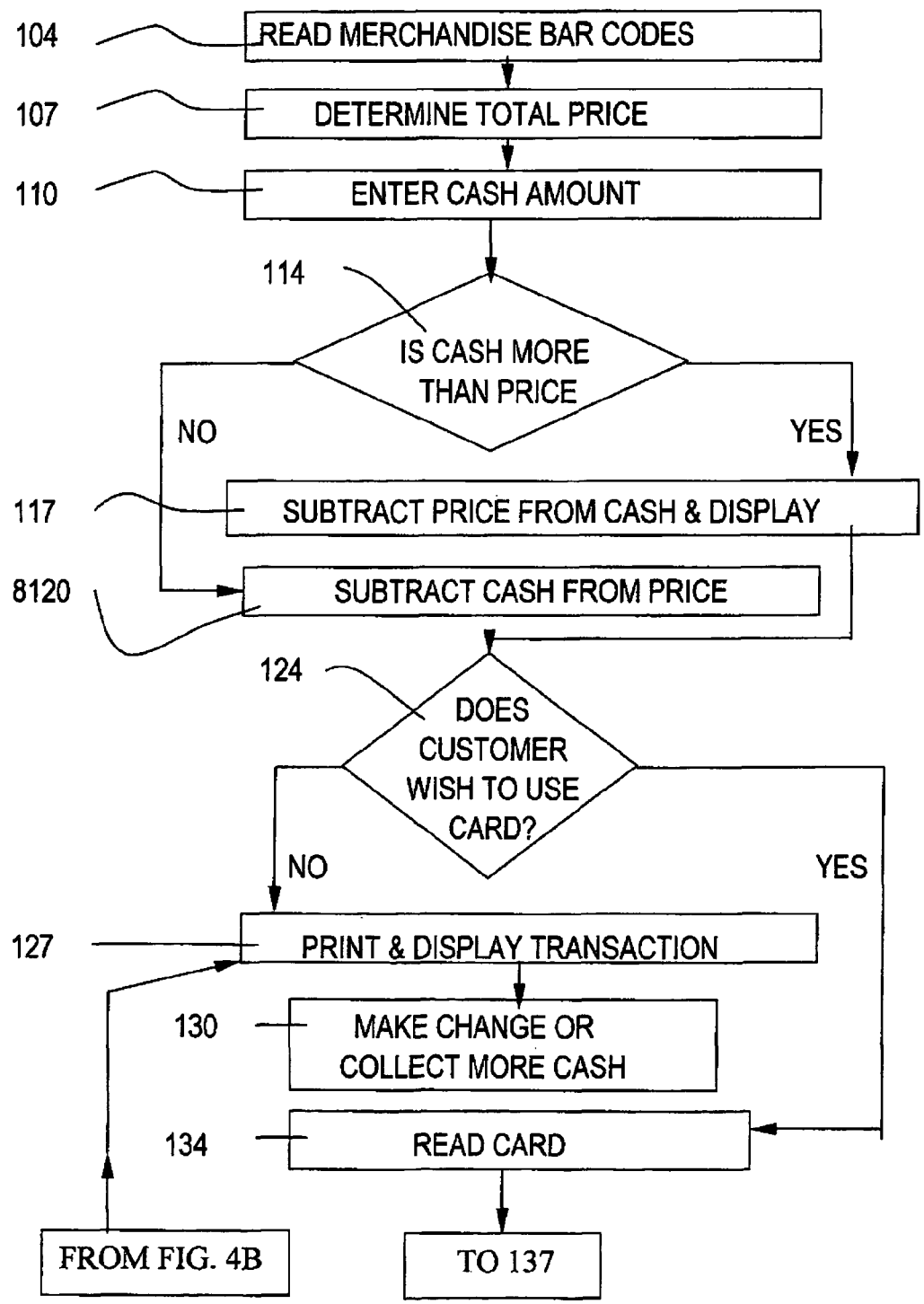

METHOD AND SYSTEM TO CREATE AND DISTRIBUTE EXCESS FUNDS FROM CONSUMER SPENDING TRANSACTIONS

REFERENCE TO CO-PENDING APPLICATIONS

The present application is a continuation of patent application Ser. No. 11/421,113 filed May 31, 2006 now U.S. Pat. No. 7,571,849 which claims benefit of my application Ser. No. 09/611,905 filed Jul. 7, 2000, which in turn is a Continuation of my application Ser. No. 08/429,758 filed Apr. 27, 1995 and now U.S. Pat. No. 6,112,191, which in turn is a Continuation-in-Part of my application Ser. No. 08/349,353 filed Dec. 5, 1994 and now U.S. Pat. No. 5,621,640, which in turn is a continuation of my application Ser. No. 08/018,821 filed on Feb. 18, 1993 now abandoned. The aforementioned Ser. No. 08/429,758 filed Apr. 27, 1995 and now U.S. Pat. No. 6,112,191 is also a continuation-in-part of application Ser. No. 08/428,401 filed Apr. 25, 1995, now abandoned and applicant also claims the benefit of the latter application.

The aforementioned application Ser. No. 09/611,905 filed Jul. 7, 2000 also claims the benefit of application Ser. No. 08/843,424 filed Apr. 15, 1997 now U.S. Pat. No. 6,088,682, which is also a continuation-in-part of the aforementioned U.S. application Ser. No. 08/349,353 filed Dec. 5, 1994 now U.S. Pat. No. 5,621,640, which in turn is a continuation of my application [1] Ser. No. 08/018,821 filed on Feb. 18, 1993 now abandoned.

FIELD OF THE INVENTION

The present application relates to improved methods and systems to create excess funds from traditional consumer spending transactions using cash, checks, credit or debit card. The excess funds created are then put aside in special accounts for future spending.

BACKGROUND OF THE INVENTION

Presently the methods and systems of creating excess funds from spending transactions have the following limitations:

(1.) Now consumers can create excess funds for future spending by making excess payments and having the excess amount assigned for future spending under very limited circumstances. Effectively consumers can tender an excess payment to a payee that they have an existing account with (e.g. utility and gas companies) and allow the excess funds to stay with the payee for the payment of future services or direct the payee to distribute the excess funds onto an outside provider, such as a charity. Under this "closed" process the payee provides an active role as to account management and selection/distribution of the excess funds for internal purposes, as well as to outside providers. Within this current arrangement the consumer has very limited opportunities to create excessive funds, as well as to determine the application of said funds, since the existing state of the art is a "closed" system essentially operated by payees with whom they have existing account relationship.

(2.) Now consumers can only create excess funds when the face amount paid to a payee is in excess of the purchase price. In addition to the requirement for an excess payment, there is also the need for the payee to process the transaction by subtracting the amount of the purchase price from the amount tendered. Therefore, the payee is now actively involved in managing and/or distributing the consumers' excess funds.

An object of the invention is to improve the aforementioned situation.

SUMMARY OF THE INVENTION

According to an aspect of the invention, such object is obtained in a method of accumulating credits in payor surplus accounts from financial transactions between a payor and a payee, by entering a demanded amount due the payee, entering an additional amount offered by the payor, and depositing the additional amount in the surplus account According to another aspect of the invention, the step of depositing the additional amount includes the payee crediting the additional amount to the surplus account in the hands of a central clearing entity, so that the payee remains neutral to the additional amounts.

According to yet another aspect of the invention, said step of entering an additional amount includes calculating the additional amount from predetermined data associated with the surplus account.

DETAILED DESCRIPTION OF PREFERRED EMBODIMENTS

Figure 1A:
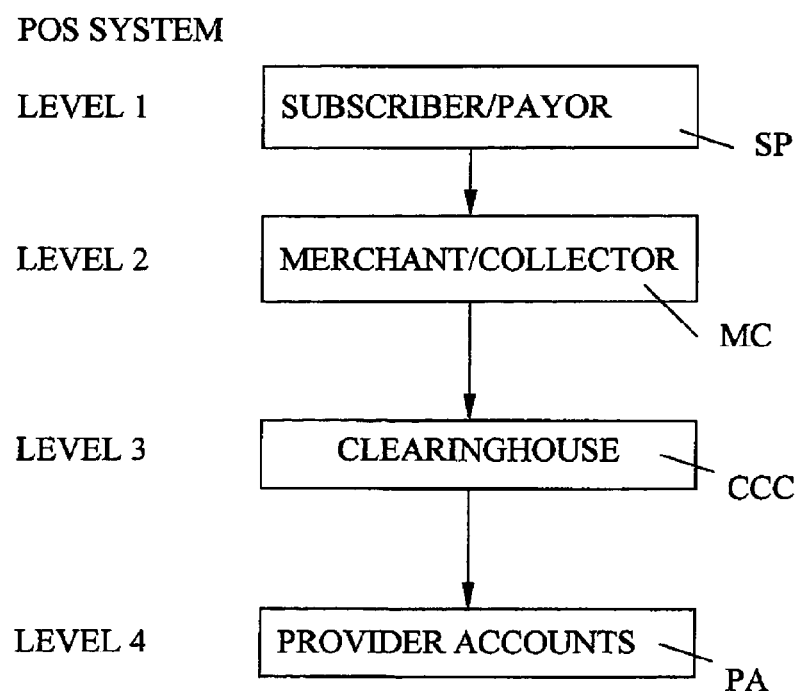
FIG. 1A is a block diagram of the POS system embodying features of the invention.
Figure 1:
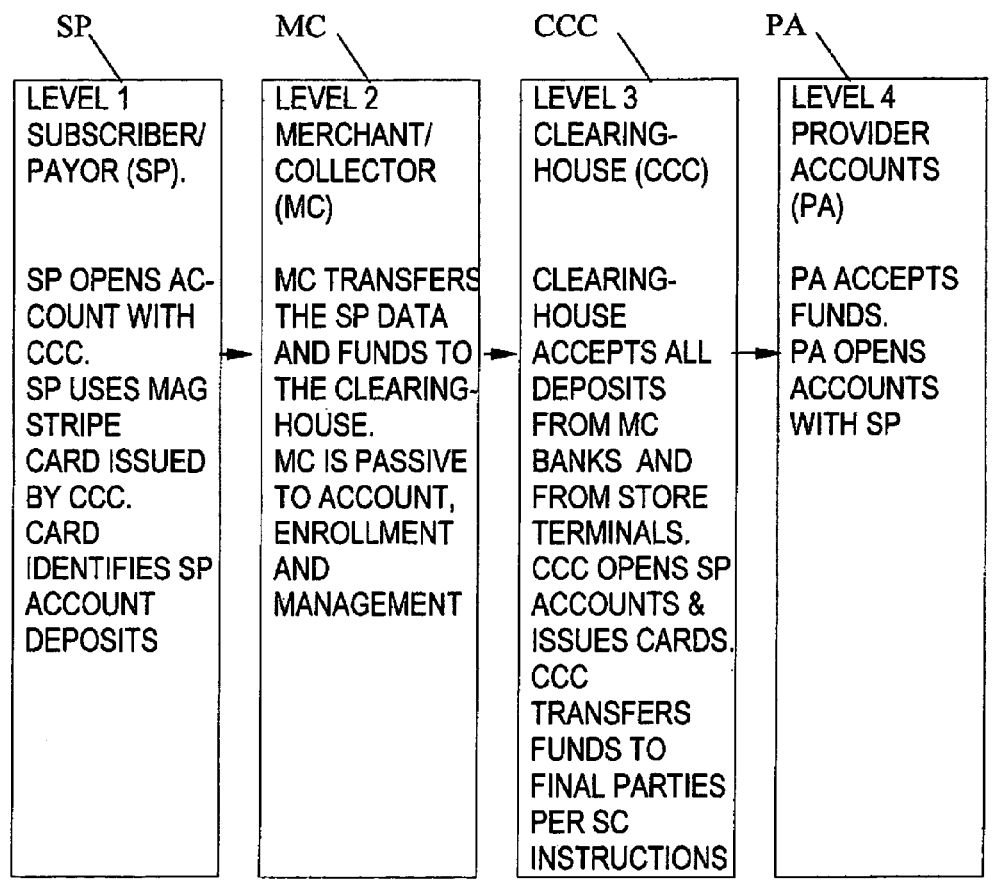
FIGS. 1B&C are block diagrams of the Clearinghouse Managed System embodying features of the invention.
FIGS. 1D&E are block diagrams of the Provider Managed System embodying features of the invention.
FIG. 1F is a block diagram of the Data and Funds Transfer used in both P OS systems embodying features of the invention.
Figure 1C:
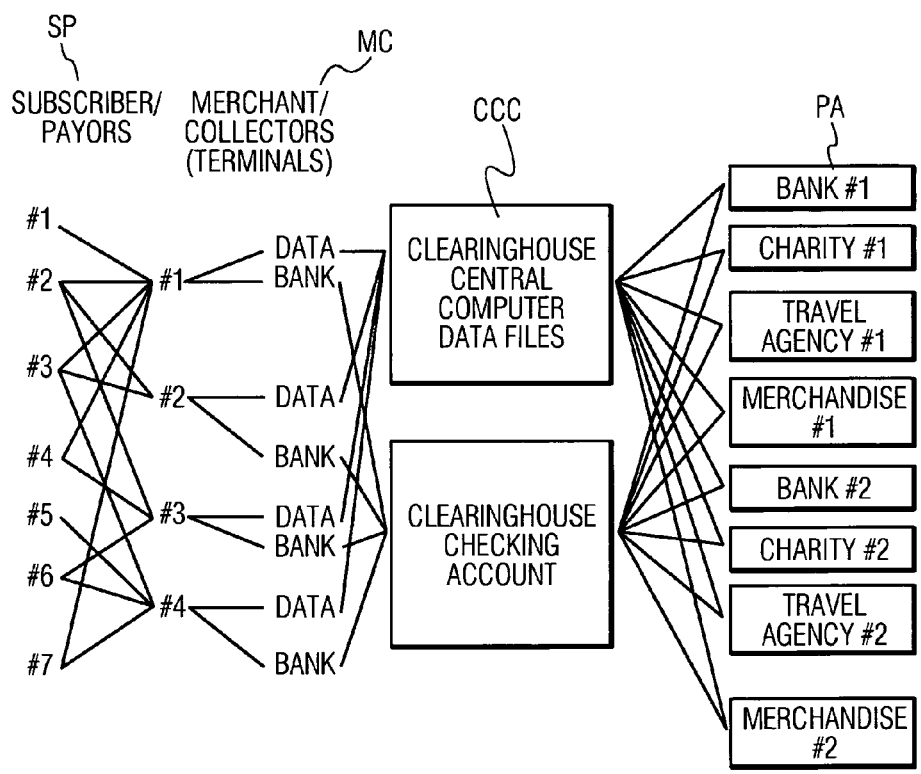

The invention has two main embodiments:

(1.) In FIG. 1A, an "open" POS network embodies a four level spending/saving system comprised of Level 1 SP (multiple subscriber/payors), who tender excess payments or deposit excess funds to Level 2 MC (multiple merchant/collectors), who in turn make computer entry of data and funds for electronic transfer to Level 3 CCC (a singular managed clearinghouse central computer), who in turn transfers data and funds to Level 4 (multiple provider accounts), for the final purchase of products or services.

In FIG. 1A the excess funds are created at point of sale counters (POS) by the merchant/collectors (MC) who "front end" process the subscriber/payor (SP) spending transactions to determine the excess difference between the purchase price of goods or services and the amount of payment rendered.

After the amount of excess funds is determined by the MC's electronic cash register (ECR), the SP makes a deposit into a clearinghouse central computer (CCC) by providing a transaction card or an account number to the MC. The MC then swipes the card or enters the account number through an ECR or a draft capture remote terminal to record the time, the terminal location, the amount of funds entered, and the account number used. The terminal or cash register then prints out a receipt of the depositing transaction and the MC returns the card and the receipt to the SP.

The depositing of individual transactions into the MC remote terminal can be completed in an "off-line" or "on-line" or a combination of both modes. At the completion of a specified period or amount, e.g. day, week, $50.00, the total off line transaction file stored in the MC terminal is then batched "on line" to the CCC (clearinghouse's central computer). The ability to process individual depositing transactions in an off line mode is made possible due to the fact that the system does not require on line authorization, as in credit and debit card processing.

Each terminal location follows the same reporting procedure so that the CCC will have a record of all transactions made into the system, regardless of the location of the terminals. The files transferred to the CCC contain details of each deposited transaction by the identification of the account, the amount of the deposit, the date, and the terminal that accepted the deposit. The actual transfer of cash into the system starts when the MC deposit the cash received from the SP into their bank for EFT transfer to the clearinghouse's bank account and concludes with the CCC EFT transferring funds to each listed PC (provider account) per the transaction records received from the merchant terminals. The transfer of cash from one account to the next is accomplished by the usual and customary bank EFT transferring through the ACH (Automatic Clearing House) or via EDI (Electronic Data Interchange).

Effectively, the system allows each SP the ability to make multiple deposits, in varied cross country locations, into terminals operated by unrelated parties, depositing as little as a penny in any one transaction, and often on a 24 hour demand basis.

The MC that operate the ECR terminals are at the time of depositing both neutral and passive as to the selection of the consumer's provider(s), as well as not directing the distribution of funds to the consumer's provider(s). Only in this system are SP able to deposit their excess change created when dealing with multiple and diverse payees. The money is deposited into an "open" network that will pool and then transfer the once fragmented funds onto PA selected by the SP. In this system as compared to the existing state of art, the PA who will receive the deposited funds from the network need not also be the original collector of the deposits. Therefore, we have a "open" system that allows for a mix and match of diverse collectors and providers.

Under the system it is possible for one entity to provide both a collector and provider role, but under different and autonomous points in the network cycle. For example, Sears may enroll a subscriber consumer in a Sears store account allowing the consumer to use their Sears issued mag stripe card to identify them when they deposit excess change into any merchant/collector terminal. In this capacity Sears is playing the role of a distinct provider in the network. The card may then be used to deposit excess funds at fast food restaurants, convenience stores, other department stores, etc. Also the SP could go into any Sears store and deposit excess funds into a Sears terminal for transfer to the network. On these occasions Sears would be playing a distinct role as a participating MC, within the network, and follow the same procedures as any other MC, as well as also being a PA at the end of the network chain.

In FIGS. 1B&C, the Clearinghouse Managed System (CMS) starts with Level 1, the subscriber/payors, tendering an excess financial payment to Level 2, merchant/collectors. They in turn enter the amount of the excess payment into an electronic cash register/remote terminals which then sends the funds and data on-line per transaction, or along with other deposits in a batched format, by a communication system to Level 3, clearinghouse central 6 computer. Level 3 assigns the funds to an account previously opened by Level 1 SP through services provided by Level 3. The funds are then forwarded, when they reach pre-selected thresholds, by EDI (Electronic Data Interface) transfer to Level 4, the provider accounts, selected by Level 1 SP.

The Clearinghouse Managed System (CMS), has the network providing a more active role by the system's central computer enrolling the SP in accounts and then assuming the role of an account manager. Under this arrangement the network will direct the overall operation of the system, issue transaction cards (bar code, mag stripe and/or "smart" cards or devices), operate the system's central computer, provide both on-line and off-line communications between the POS terminals and the central computer, accept funds, assume fiscal responsibility for the SP funds on deposit, maintain all account records, provide provide all outside payments to parties selected by the SP, and even allow the SP the ability to access their accounts for the purpose of receiving credit at the time of POS purchase to pay the MC. Under the CMS, in addition to the network serving as an account manager, it will also appoint banks, credit card institutions, and merchant/collectors to assume additional fiduciary responsibilities.

Figure 1D:
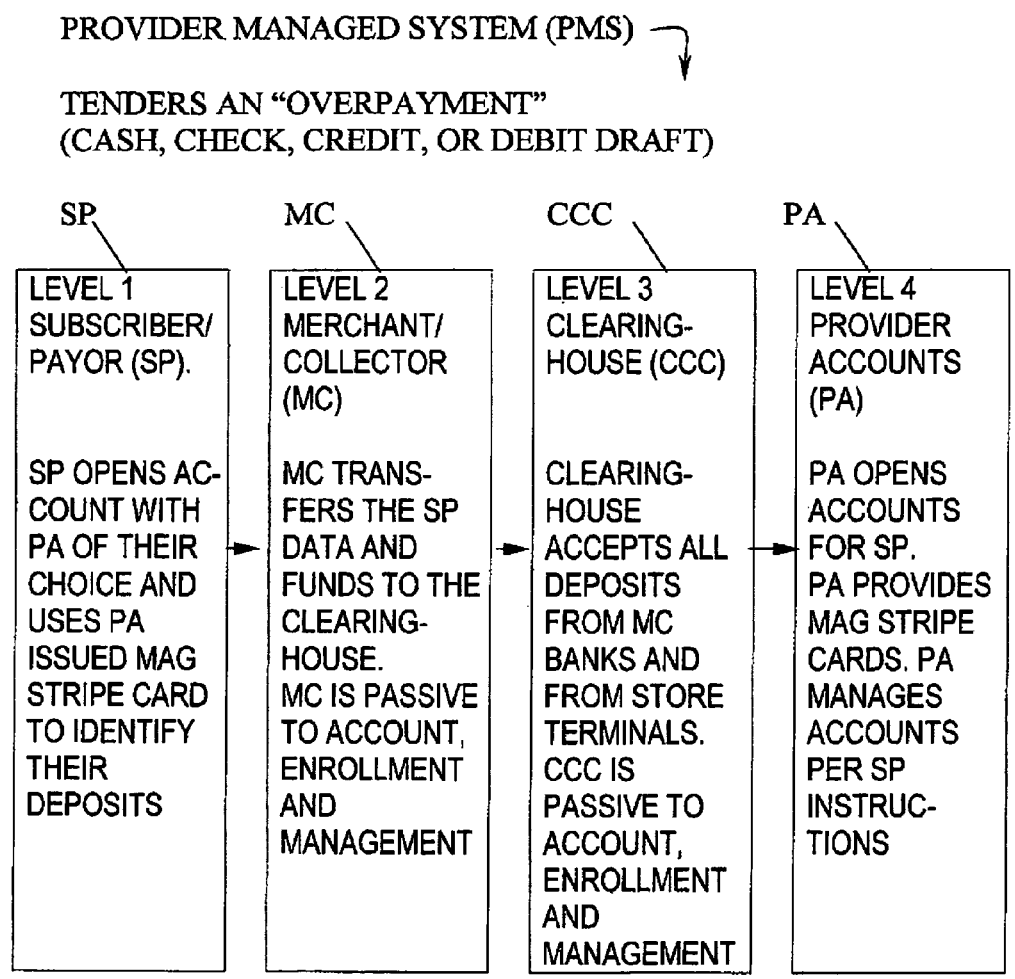
Figure 1E:
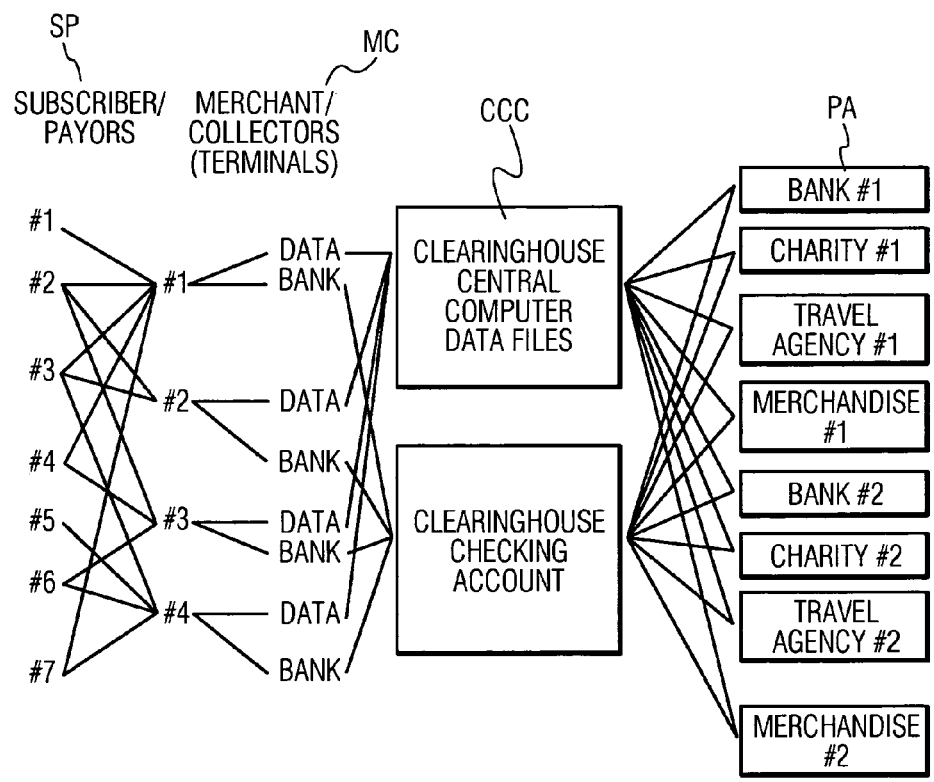
Figure 1:
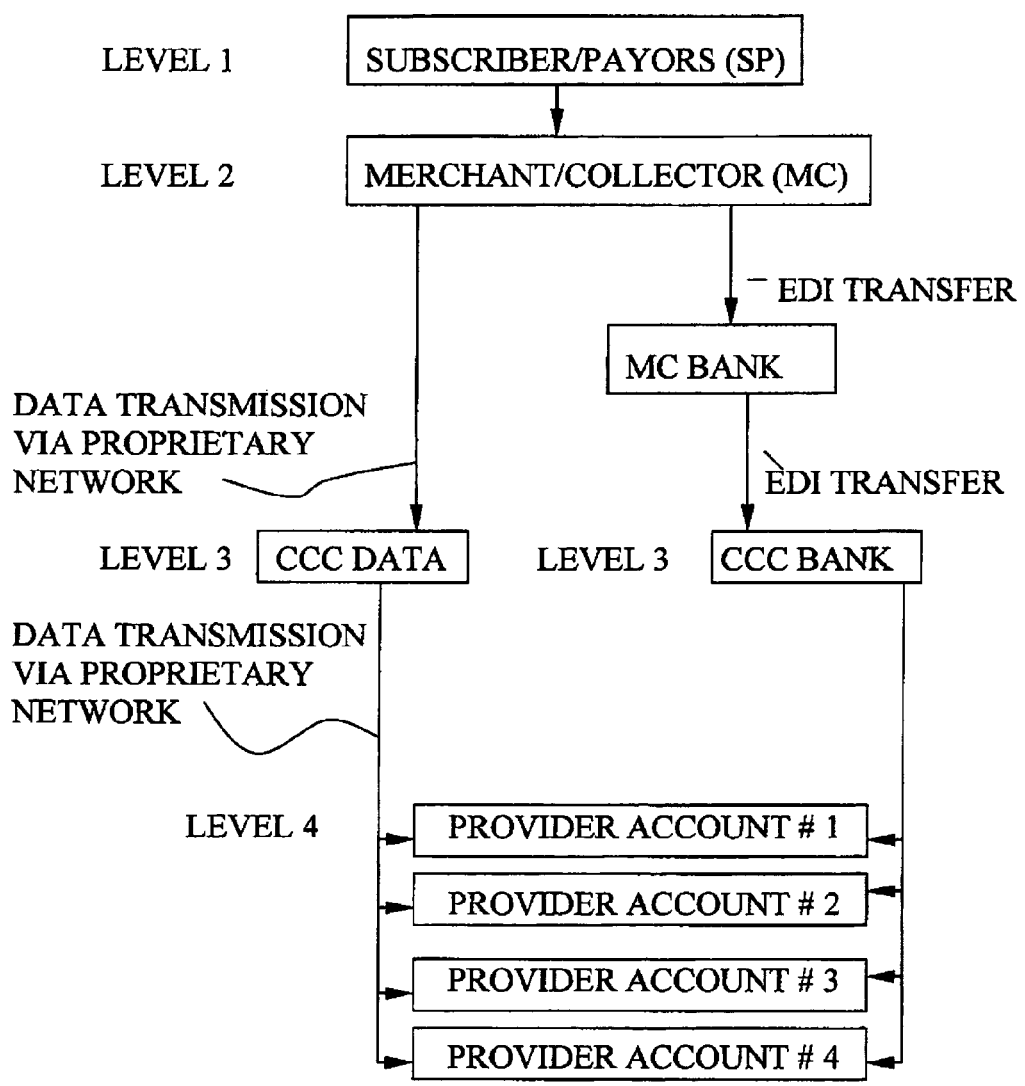

In FIGS. 1D&E, the Provider Managed System (PMS) starts with Level 1, the subscriber/payors, tendering an excess financial payment to Level 2, merchant/collectors. They in turn enter the amount of the excess payment into an electronic cash register/remote terminals which then preferably send the funds and data along with other deposits in a batched format, by a communication system to Level 3, clearinghouse central computer.

Level 3 then segregates the transactions per provider accounts. The data and funds are then forwarded, when they reach pre-selected thresholds, by EDI (Electronic Data Interface) transfer to the Level 4 providers for account management and final distribution. Level 1 SP initially join the network by enrolling in accounts with Level 4 providers.

The Provider Managed System (PMS), is an "open" system that creates a network whereupon SP will directly enroll in accounts managed by PA, receive mag stripe cards issued by the PA, and deposit their excess change at POS locations to be transferred by the MC to a neutral network clearinghouse (CCC). Under the PMS, the CCC will accept and process the transaction data and funds and forward both to the PA according to the card identification. The PA will then manage the accounts per the SP instructions.

In the PMS scenario both the merchant/clearinghouse are passive as to the opening of accounts and the SP selections of the final distribution of the funds. Here both the payees and the clearinghouse only accept deposits and transfer both the cash and transaction records onto the end PA.

Also under the PMS embodiment, once the funds are received by the PA, who can be banks, insurance companies, security firms, merchandisers, travel agencies, charitable institutions, etc., the SP will determine how to spend the savings for services and/or products.

In FIG. 1F, in both the Clearinghouse Managed System or Provider Managed System the data transfer is sent via a proprietary network from Level 2 MC to Level 3. After processing by Level 3 selected data is sent via a proprietary network to Level 4. On the funds transfer side Level 1 deposits the funds at Level 2 outlets. Level 2 deposits the funds into the MC's bank account and by EDI the funds are transferred to Level 3's bank account for final EDI to Level 4's bank account.

Figure 2:
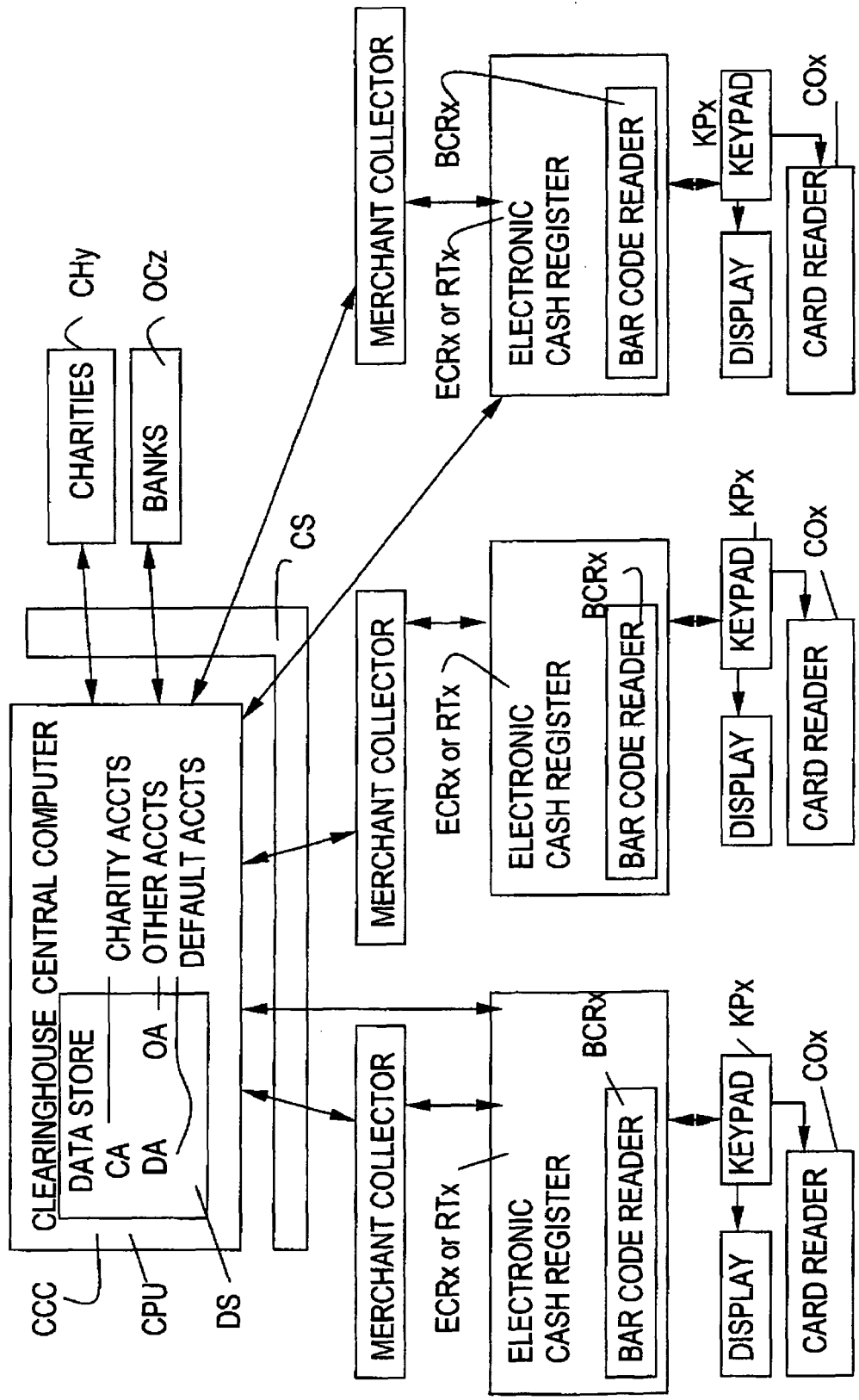
FIG. 2 is a block diagram of POS system hardware in FIG. 1.

In FIG. 2, a system embodying the POS invention includes a clearinghouse central computer (CCC) containing a central processor CPU and a large data storage DS. A communications system CS that may include telephone lines, satellites, or cables connects the CCC to a number of electronic cash registers (ECRx) (where x=1, ... M, ... N) in retail outlets, such as shops, supermarkets, gasoline stations, department stores, etc. at locations remote from the central computer. Throughout this specification, the term x, when appended to the end of a reference character, is equal to 1, ... M, ... N.

The ECRx cash registers are connected to respective keypads KPx and card readers CDx. Along with other components together they constitute a remote terminal RT that is connected to a variety of central computers.

In the CMS embodiment of the invention accounts are managed in the CCC. Money is collected at the ECRx for crediting to the consumers' ledgers in the accounts of various charities and other institutions such as banks, debit card issuers, credit card issuers, etc. The data storage DS contains individual storage for charity accounts CA and other accounts OA, such as for banks etc., all with ledgers for individual consumers.

In the PMS embodiment of the invention the CCC acts as a clearinghouse and transfers all data and funds onto the respective PA for account management and final distribution.

The CCC communications system CS also connects the CCC to charity computers CHy and other computer OCz, where y=1 ... k, and z=1 ... j such as bank computers, merchandise computers, debit account holders, credit card issuers, etc. These charities and other institutions are the ultimate receivers of the donations and deposits collected at the electronic cash registers ECRx. The CCC also includes a default account DA with consumer ledgers to hold moneys not otherwise allocated.

The ECRx includes a change display for exhibiting cash transactions, credit cards, or check purchases. The display automatically operates to show numbers in question. A card reader CDx with a keypad KPx allows the SP or clerk to enter the deposit directly. The keypad KPx permits the SP to change the allocation for this transaction alone or permanently. The keypad KPx also allows the SP to reduce the amount deposited so that he can receive cash change. The terminal RTx or ECRx reports the deposit directly to the CCC via the communication system CS. The CCC prints out periodic reports for interested parties on a need-to-know basis.

According to the invention, a consumer in a shop, supermarket, gasoline station, department store, etc. selects the desired merchandise and brings them to a clerk. The clerk inputs the price of all items in a ECRx by way of a register keyboard or a bar code reader and the register totals the price. The consumer offers the clerk either the exact amount of cash or a sum exceeding the price. Then the clerk enters that cash and the amount into the cash register. The ECR subtracts the price from the cash.

If the consumer gives the clerk the exact price nothing more need happen. However, if the money offered the clerk exceeds the price, the consumer may, if he or she wishes, choose to receive the change or to donate or deposit all or a portion of the change. To do the latter, he or she enters a card number into the keypad KPx or enters the card itself into the card reader CDx. The latter reads the number from a bar code or magnetic stripe on the card. The consumer can also enter into the keypad how much of the total change, he or she is to receive, should be credited to various predetermined accounts in the CCC. The register ECRx reads the numbers entered into the keyboard or the number entered by way of the card reader CDx.

In addition if SP wish to make a direct deposit of funds into the network, (rather than make a purchase and tender excess funds), all that is necessary is to enter the amount deposited into the ECRx and the funds will be transferred to the CCC.

Figure 3:
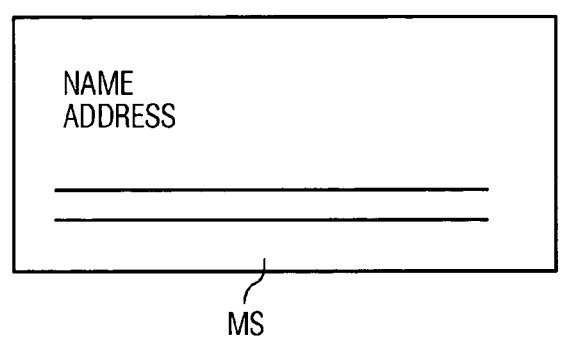
FIG. 3 are views of transaction cards forming part of the embodiment in FIG. 1.
Figure 3:
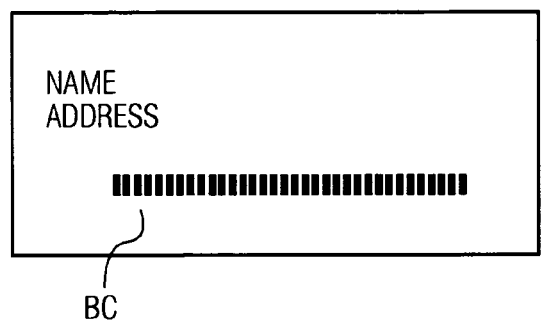
Figure 3:

A transaction card DC1 according to the invention appears in FIG. 3 with a magnetic stripe MS carrying the donor's number. A card DC2 in FIG. 3 includes the number in the form of a bar code BC. In another embodiment of the invention the card may be a smart card. Also in regard to the use of bar codes, the codes may be incorporated in the design of a key chain device or displayed on windshields or car windows to allow the invention to be accessed under a variety circumstances, i.e., drive through window, toll booth, etc.

After receiving the data, the ECR accesses the CCC. The latter allocates the change, a portion of the change, or the amount of a direct deposit provided by the SP among various charity accounts CA and other accounts OA in the CCC. The distributions to various accounts are preprogrammed commands which the consumer has previously instructed the CCC to complete. For each deposit or donation made, the SP receives a printed receipt of the transaction from the ECRx or RTx.

If desired, the consumer can choose to deposit only a fraction of the difference between the cash presented and the price. The consumer then enters the amount to be deposited and receives the appropriate cash change.

According to an embodiment of the invention, with every transaction, the computer electronically transfers all amounts allocated to each charity CHy immediately, as soon as the computer can access the charity computer, or when there is a sufficient amount of money. In this way the donor is always assured that the contribution takes effect. Deposits in the other accounts OA may be sent immediately or held until a sufficient amount is accumulated to be acceptable by the other institutions.

An example of the operation of the CMS embodiment appears in the flow chart of FIGS. 4A&B. This flow chart depicts an on-line version of the CMS embodiment. The CMS, however, could also be operated in an off-line mode and the transactions that are processed by Level 2 MC would then be stored in memory and transferred in a batched format to Level 3 CCC at periodic intervals. In FIGS. 4A&B it is assumed that the customer is purchasing merchandise that may carry bar codes. However, the invention is also applicable for purchase of services, rentals, or other valuables.

In step 104 of FIG. 4A, the clerk enters the prices of the various piece s of merchandise, either by way of a keyboard (not shown) or a bar code reader BCRx, into the cash register ECR. In step 107, the cash register determines the total price. The customer then gives the clerk the cash to cover or exceed the total price. While this example refers to cash, the invention is also applicable to payment by check, credit or debit card. That is, the customer may wish to have an amount charged to the checking account, credit or debit card in excess of the price in order to make donations or distributions according to the invention. For purposes of this description the word cash is used also to embrace check, credit or debit card payments.

In step 110, the clerk then enters the amount of the cash payment into the ECRx. Under normal circumstances, the cash payment will equal or exceed the total spending price unless there is deposit of cash into the system without a purchase. However, the invention invention allows the SP to withdraw moneys from a credit balance in one of the accounts recorded in the CCC. While unlikely, this may also occur with a credit or debit card sale. Thus, in some situations, the amount of cash may fall short of the total price. In step 114 the cash register determines if the amount of cash exceeds the total price.

If the answer is yes, the cash exceeds the sale price, the ECRx determines the amount of change by subtracting the price from the cash in step 117. If the answer is no, the cash does not exceed the sale price, the register determines the amount due in step 120. In step 124, the cash register ECRx asks whether the customer has and wishes to use a network card. The clerk or customer may respond by keyboard, or directly by entering the card into the card reader CDx.

If the customer does not have or does not wish to use a network card in response to step 124, the cash register ECRx prints the transaction in step 127 and in step 130, prompts the clerk to make change or collect more cash. If the customer does not offer any needed cash the clerk must abort or otherwise correct the transaction.

If the customer wishes to use a network card, the clerk may enter this information into the register's keyboard, or the customer may enter the card into the card reader CDx. In step 134, the ECRx reads the network card. In step 137, the ECRx determines whether the card 4 is valid. If not, the register ECRx returns to step 127.

If the card is valid, the ECR again asks if the cash offered exceeds the total price in step 140. If not, in step 144, the ECR prompts the cash register CR display DS to ask if the cash register should debit the deficient amount from one of the SP cardholder's accounts. If not, the process returns to step 127.

If the answer to step 144 is yes, the computer CCC, in step 145, asks the customer to enter his or her personal identification (PIN) number. In step 146, the CCC determines if the PIN number matches the card number. If not, the computer returns to step 127. If yes, it determines if the card contains a sufficient balance to cover the amount due. If not, the process again returns to step 127. If yes in step 150, the computer withdraws the money from the card account and credits it to the account of the establishment or the sponsor SPx as pre-programmed. In step 150 the cash register ECRx also prints out the transaction.

If the answer to step 140, namely to the question whether there is more cash than the price, is yes, step 154 causes the ECR to display a message asking whether the customer wishes to retain some of the change due. If yes, the ECR prompts the customer to enter into the keypad KPx how much he or she wishes to retain or deposit. In step 157, the cash register ECR indicates to the clerk to give the appropriate net change and shows the net deposit amount.

Figure 4B:
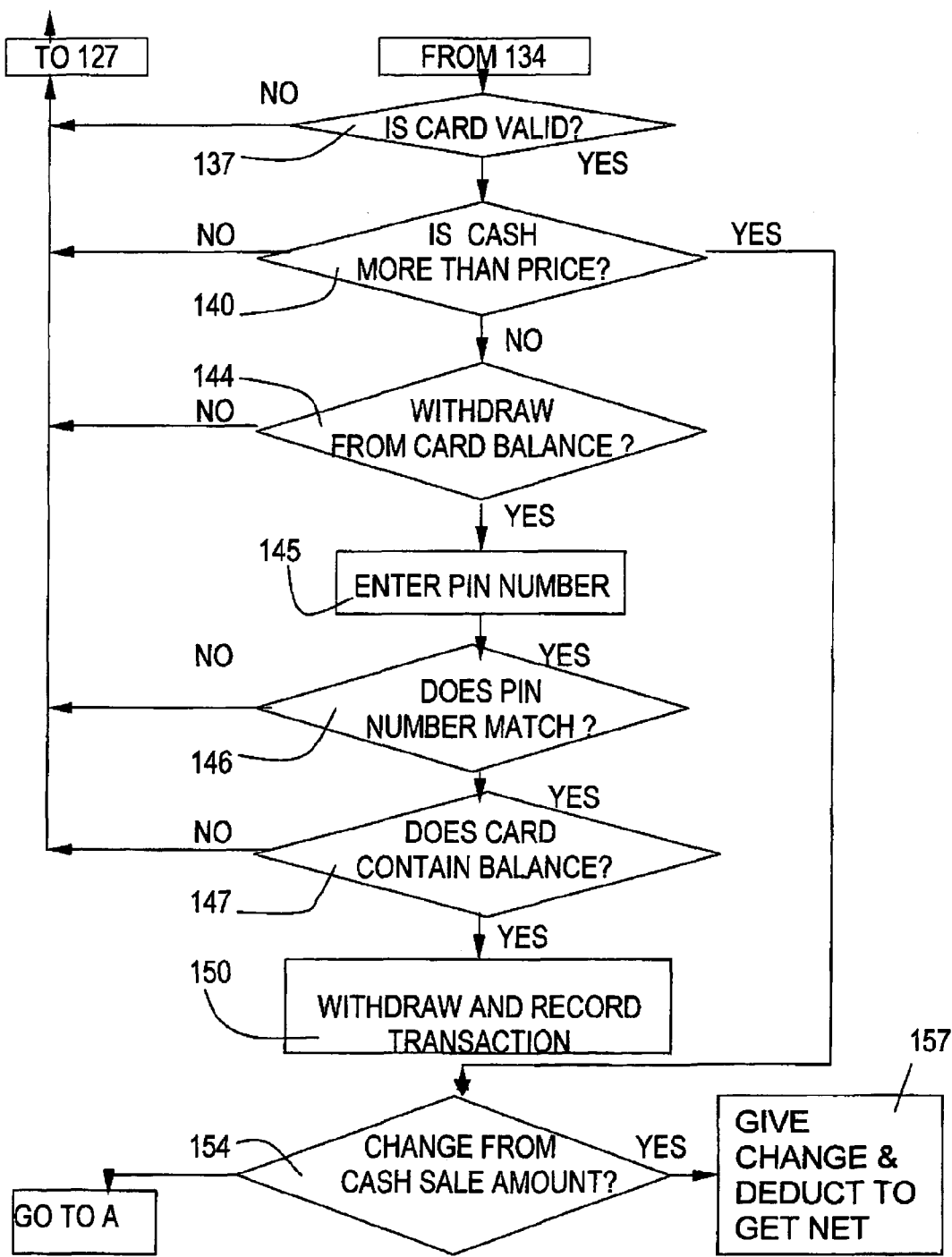
FIGS. 4A&B are flow diagrams of the steps that take place in FIG. 1B.
FIG. 4C is a flow diagram that is a continuation of the flow of FIG. 4B.
Figure 4C:
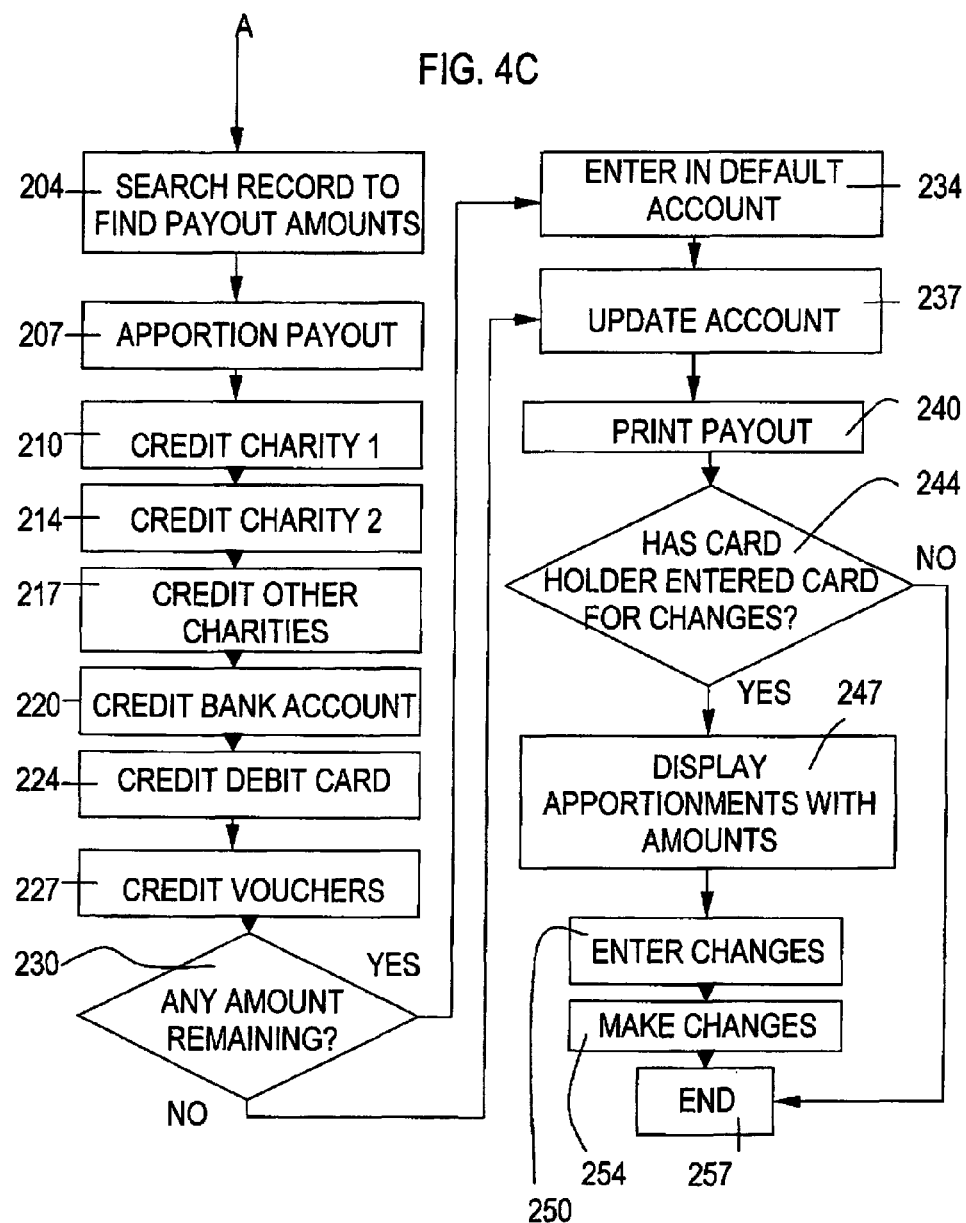

The process now goes to A in FIG. 4B. If the answer to step 154 is no, the process also continues at point A in FIG. 4B.

Figure 6A:
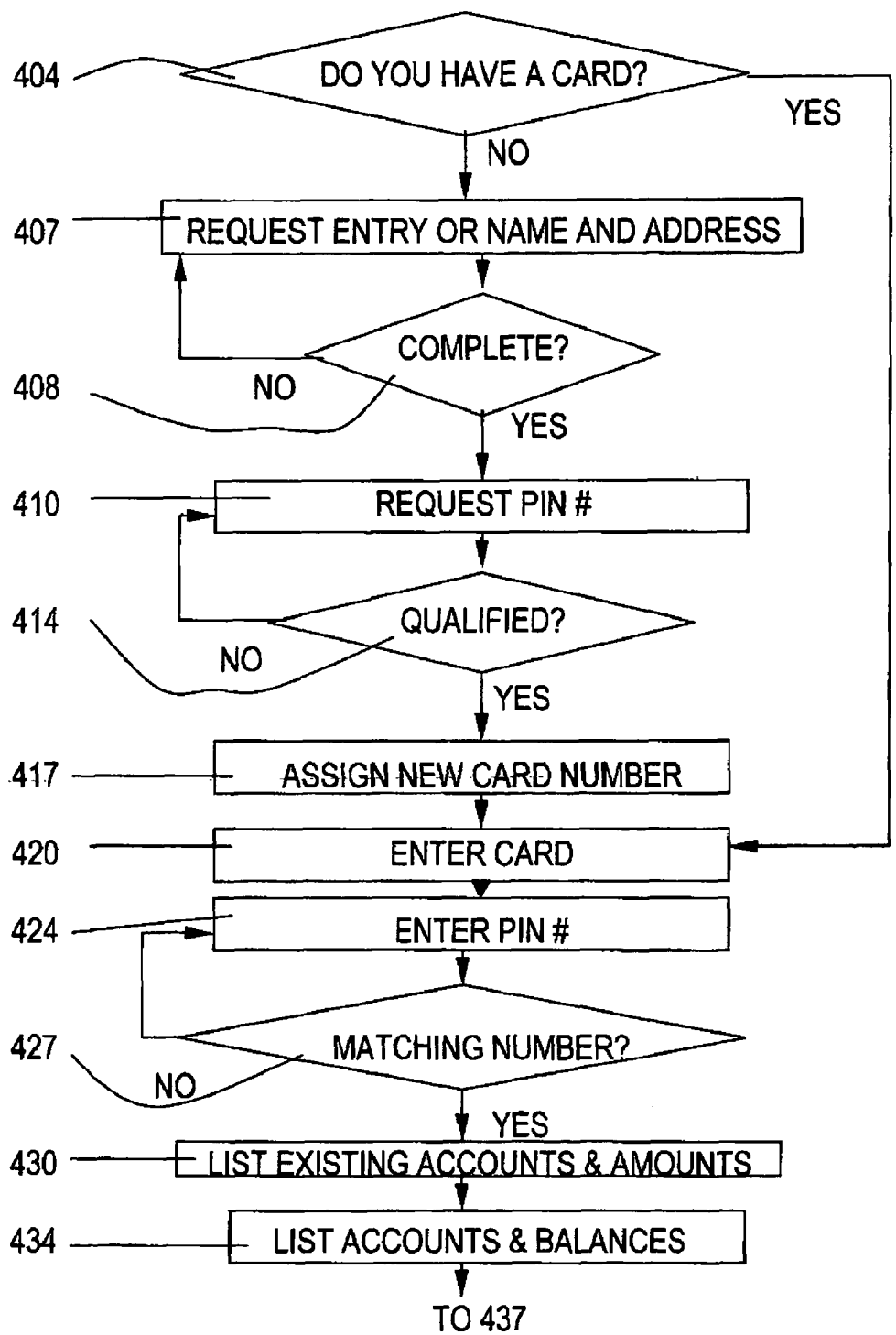
FIG. 6 is a flow diagram of enrollment steps that take place in a computer in FIGS. 1B&C.
Figure 6B:
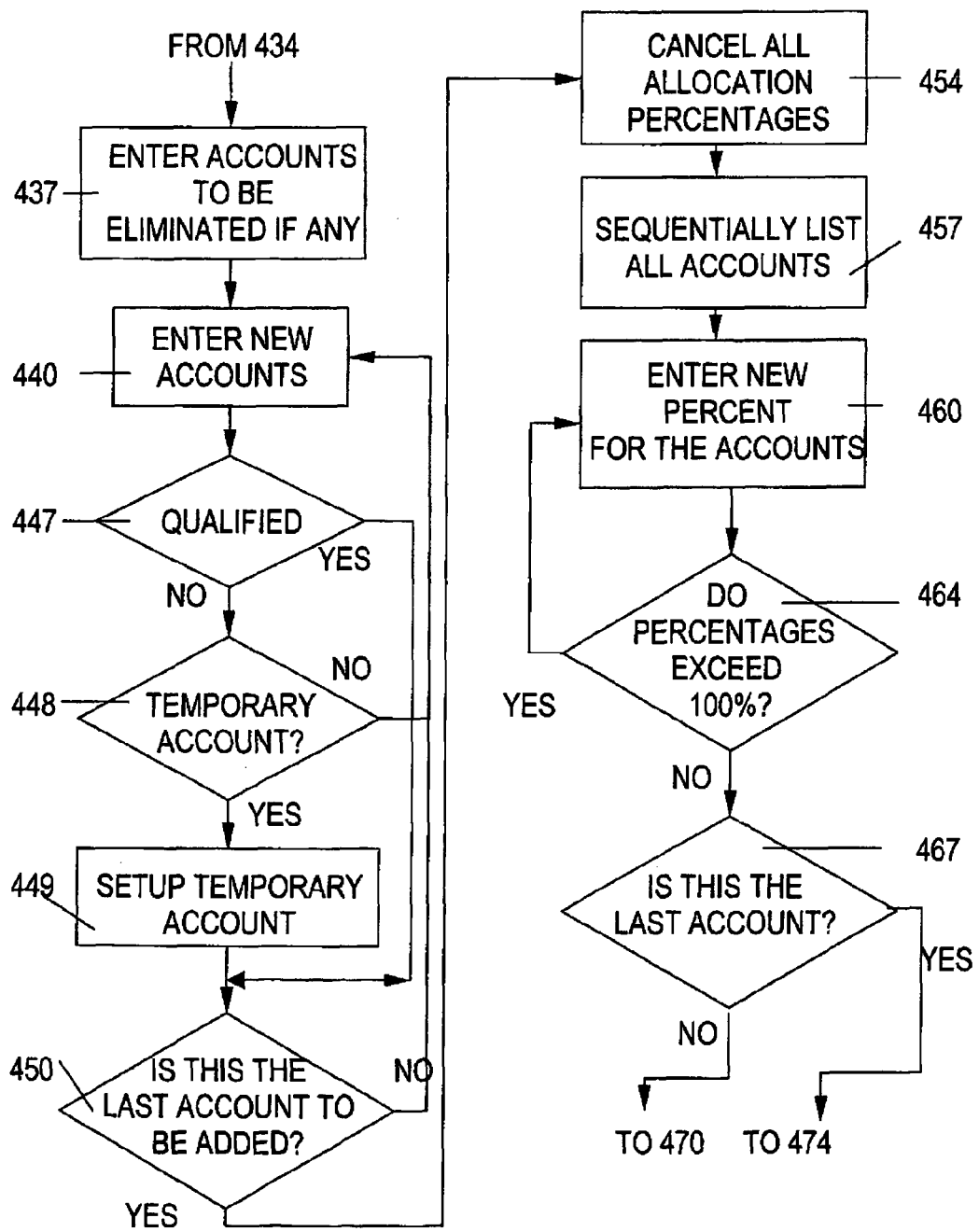
Figure 6C:
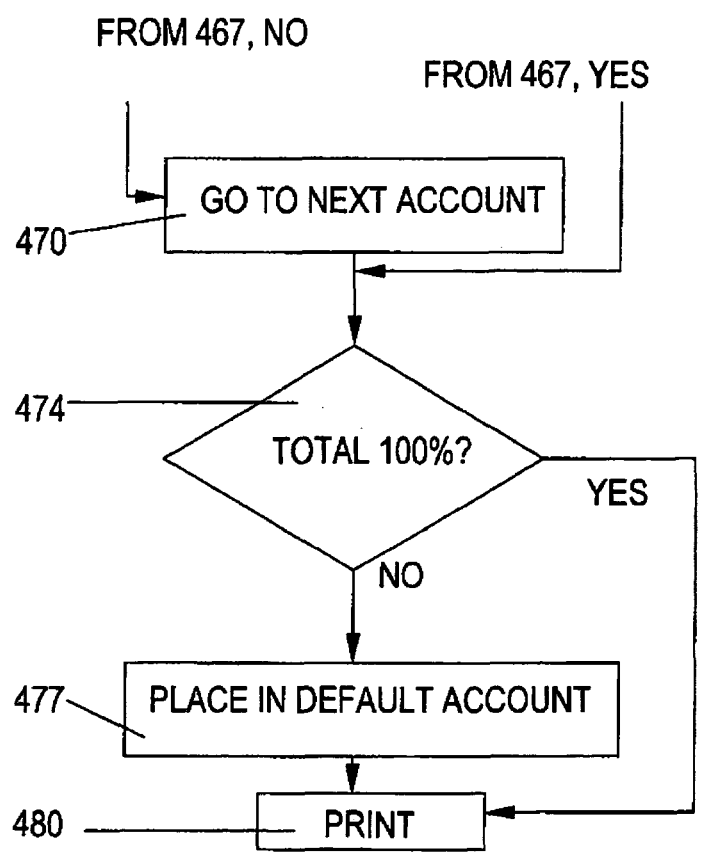

At A, step 204, in FIG. 4B the CCC searches the records to find the pre-programmed pay out amounts for the particular network card. The pay out amounts are entered as shown in FIG. 6. In step 207 of FIG. 4B, the CCC starts apportioning the pay out amounts in the pre-programmed proportions by priorities and amounts. In steps 210 to 227 it enters the selected amounts in the accounts of various charities, banks, debit card, and vouchers. Normally there should be no remaining amount. However, such an amount may exist. Thus in step 230 the CCC asks if there remains any outstanding amount. If yes, step 234 enters it into a default account selected by the SP at an earlier time. In step 237, the CCC updates the accounts both in its own data banks and in the computers CHy and OCz. The computers CHy and OCz confirm the transactions.

If the answer to step 230 is no, there are outstanding amounts, the process goes to step 237 directly. In step 240 the ECRx prints out the amounts deposited, entered into various accounts, the prices, the change, etc.

The CCC and the ECRx then prompt the customer in step 244 to ask if he or she wishes to change the programming of the various accounts in the CCC. If yes, the card reader CDx or the CCC displays the apportionment and the amounts, including balances in step 247, the consumer then enters the desired changes in step 250, and the CCC or the card reader makes the changes in step 254. This ends the transaction in step 257. If the answer to step 244 is no, the process goes directly to step 257.

In one embodiment of the invention, the consumer carries out steps 244 to 254 at a separate time in a separate card reader CDx and keypad KPx. This prevents the consumer from using these machines while the clerk serves another customer. In fact, the establishment may furnish a separate terminal RTx just for this purpose.

Prior to listing in the CCC, the invention qualifies each charity for their tax exempt status, operations, management activities, litigation, and other pertinent legal and financial information. The charity must certify to the facts. If the reported information meets the requirement, the charity qualifies. The CCC initiates a checking and updating of the qualification facts on a regular basis. The CCC keeps the qualified charities current on an ongoing basis.

The register furnishes the SP with a printed receipt of each donation for tax purposes and authentication that the charity will receive the money. In an on line mode the receipt can show the date, outlet location, serial number, amount donated, total donated to date, and the current financial results of any specific campaigns or projects received by the charity overall.

One embodiment of the invention furnishes other rewards to the donor. For example, the terminal may play a tune, such as "It's a Small World" in response to a donation to the United Nations children's fund. Alternatively, the donor may receive a message that the last ten cent donation has closed another $100 unit in donations to this charity and provide a special discount coupon. As another example the donor may receive a message that the donor's contribution is being matched by an independent sponsor with a bonus donation.

The invention supervises, implements, and coordinates charitable contributions to benefit all participants in the giving cycle, including the donors, sponsors, charitable organizations, Internal Revenue Service, and end recipients. It allows remote receiving and sending stations, connected to a central processing station, to accept any denomination of giving from a single penny to unlimited dollars. Regardless of the size of the donation, it effectively warrants to all participants that the designated charity has received the donated funds. It thus supports the authenticity of each donation. It can offer unlimited access to the donors concerning their contributions to charities and savings accounts, the intended use of the funds, and feedback concerning the total received by the funds.

The invention effectively leverages the power of mere pennies into substantial dollars that in turn become available to charities on a short term collection basis. It rewards and encourages philanthropic giving and savings to all individuals on an everyday basis An example of the operation of the PMS embodiment appears in the flow chart of FIGS. 5A&B. In the PMS embodiment, the opening and closing of accounts is assumed by PA central computers. This flow chart depicts an off line version of the PMS embodiment in which transactions are processed at Level 2 MC and then stored in memory and transferred via a batched format to Level 3 CCC at periodic intervals. Level 3 would then sort the transactions according to Level 4 account origination and forward said transactions to Level 4. The PMS, however, could also be operated in an on line mode and the transactions would then be processed by a smart card or on line with a central computer located at Level 3 or 4.

Figure 5A:
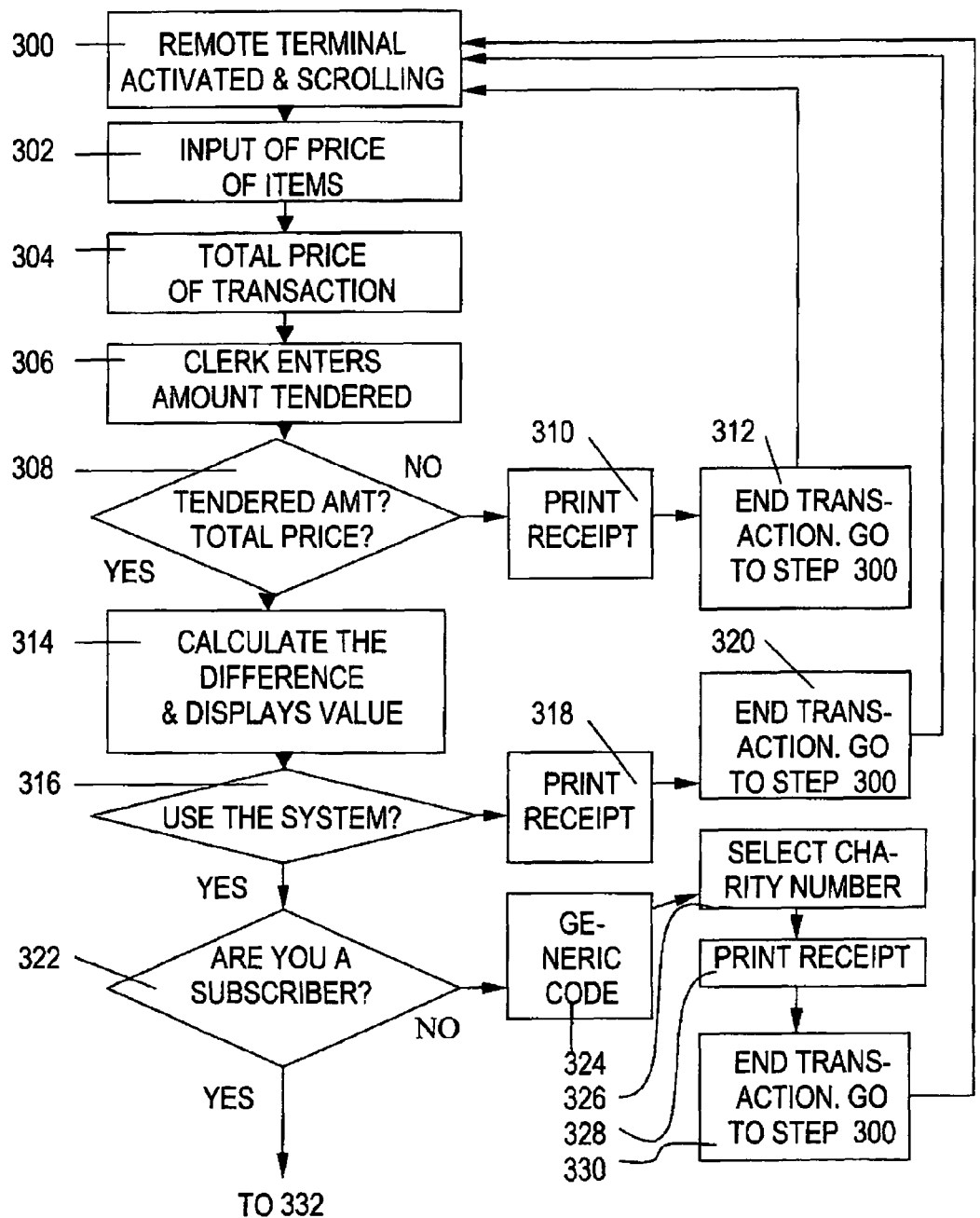
FIG. 5 is another flow diagram of steps that take place in a computer in FIG. 1C.

Referring now to FIGS. 5A&B, there is a flow chart which illustrates the steps which the PMS processes transactions made through ECRx at Level 2 MC.

Beginning at the top, in step 300, the remote terminal at the POS counter stands ready to receive input and is also scrolling information messages on how to use the system.

In step 302, the clerk inputs the price of each item into ECRx by a bar code reader or by keypad.

In step 304, the terminal computer totals the price of all of the items.

In step 306, the clerk enters the amount of payment, on most occasions cash, into the terminal computer. However, if a check, debit or credit card is tendered by the SP, any excess payment effectively becomes cash and is therefore eligible for deposit.

In step 308, the terminal computer asks if the amount tendered is more than the total purchase price.

If no and the number is zero, the terminal computer goes to step 310 and a receipt is printed out. In step 312 the transaction would end and the terminal computer returns to step 300 for new transactions.

If yes, in step 314 the terminal computer calculates the difference and displays the value and goes to step 316. In step 316 the terminal computer asks if the consumer wishes to use the system.

If the answer is no, in step 318 a receipt is printed out, and in step 320 the transaction is ended and the terminal computer returns to step 300.

If the answer to step 316 is yes, in step 322 the terminal computer asks if you are a subscriber?

If the answer is no, step 324 allows a non-subscriber to use the system by asking the clerk to enter in a generic access code. On these occasions, most likely, the non-subscriber will be making a donation for charitable purposes. At this time in step 326, the non-subscriber will pick from a list of approved charities and the clerk will key in the selection. In step 328 a receipt will be printed showing evidence of the contribution. This same receipt will also provide an audit trail for individuals and or organizations to confirm that the charitable institutions received the donation. In step 330 the transaction would end and the terminal computer returns to step 300.

Figure 5B:
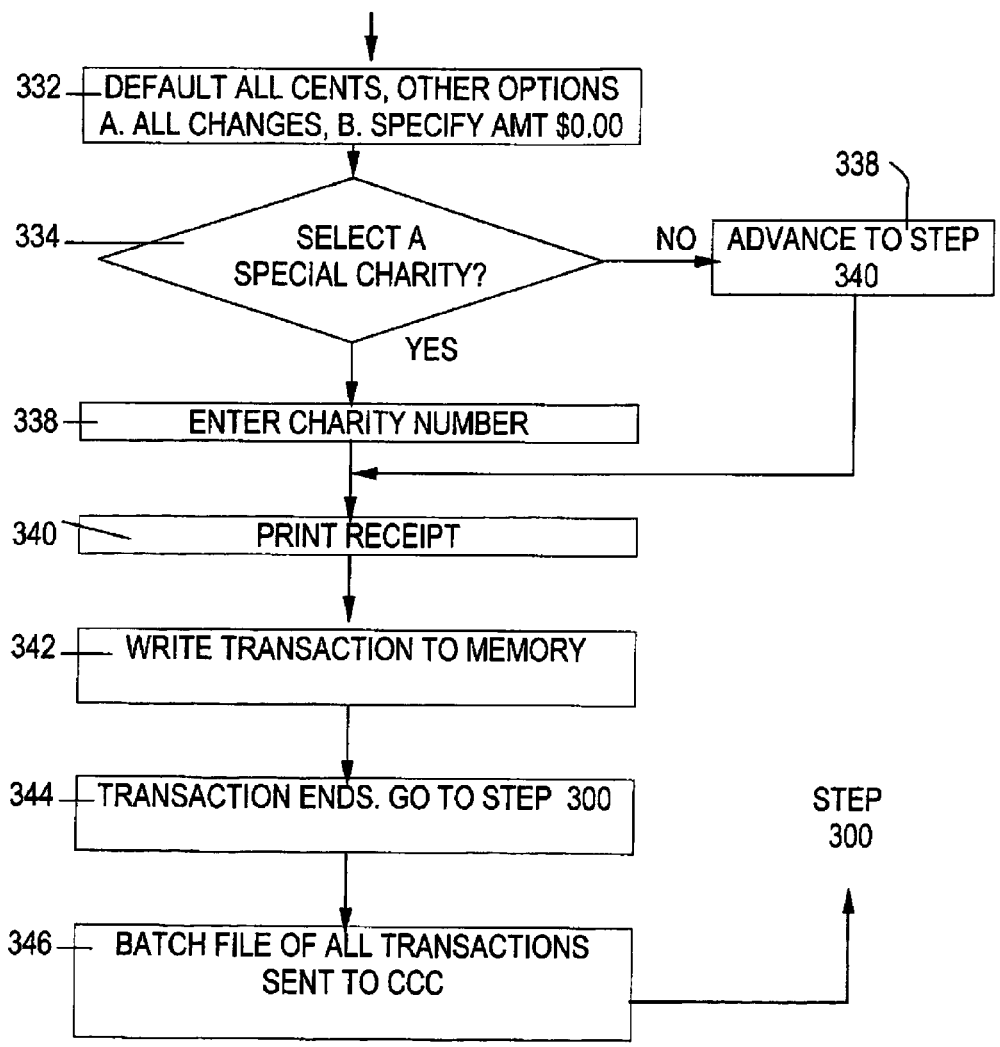

Referring now to FIG. 5B if the answer is yes, in step 332 the subscriber or the clerk enters the subscriber's card into the terminal. The terminal computer reads the card and automatically records all of the cents in the POS change as a deposit or contribution. If the subscriber wishes to add in all of the change (coins and bills) 332A is entered into the computer. If the subscriber wishes to add in a specified portion of the change, 332B is prompted into the keypad along with the specified amount, for example $1.54 out of $2.54 in available change.

In step 334, the terminal computer asks if the subscriber wishes to bypass their default instructions for charities and select a special charity for this transaction.

In step 336 if the answer is no, the terminal computer advances to step 340.

If yes in 334, in step 338 the bypass charity account number is entered into the terminal computer through the keypad.

In step 340 the subscriber will receive a receipt showing their donor contribution.

In step 342 the terminal computer writes the transaction into memory. In step 344 the transaction would end and the terminal computer returns to step 300.

In step 346, on a programmed time basis, the terminal computer forwards, by modem, the batch transactions held in memory to Level 3 CCC.

In order to enroll in the CMS embodiment, SP would sign up for accounts with Level 3 CCC. In order to enroll in the PMS embodiment, SP would sign up for accounts with Level 4 PA.

FIG. 6 is a flow chart that illustrates the enrollment steps for a CMS or PMS account which a central computer takes, through the keypad KPx, to open or revise an SP account. A display DSx on the keypad KPx or the ECRx allows a central computer to ask the consumer to perform certain acts. After the party has accessed the computer, in step 404, it asks whether the consumer has a network card. If no in step 407, the computer asks the consumer to enter his or her name or address. In step 408 the computer determines if all information has been entered. If not, it returns to step 407 to ask again for the desired information. If yes, the computer proceeds to step 410 to ask the consumer to choose a personal identification (PIN) number. In step 414 the computer determines if the PIN number is acceptable. If not, it returns to step 410 for another number. If yes, the computer advances to step 417 to assign a new card number.

If the answer in step 404 is yes, that the consumer has a card, the computer proceeds to step 420 to have the customer enter the card. In step 424 it asks the consumer to enter his or her pre-selected PIN number. In step 427 it determines whether the entered PIN number matches the pre-selected PIN number. If not, it returns to step 424 for a corrected number. The computer allows this procedure between steps 424 and 427 to occur only three times, thereafter it aborts the program.

If the PIN number is correct and thereby qualified, the computer in step 430 lists all existing accounts and amounts deposited during any specific time period, such as the calendar year. The consumer may request any time period. In step 434 it also lists all accounts with balances. In step 437 it asks the consumer to list all accounts to be eliminated, if any. In step 440 it asks the consumer to approve any accounts to be eliminated if any. The computer then proceeds to step 444 to list all new accounts. Step 444 also receives a prompt from step 417 if the card number is new.

In step 447 it determines if the account, in the form of a charity, merchant, or institution, is in the list of charities or institutions that have been accepted by the system. If the answer is no, the computer in step 448 asks if the consumer wishes to have a temporary account set up for that donee or institution pending investigation. If yes to step 448, the computer in step 449 sets up a temporary account, and lists it as qualified pending investigation. If the answer to 448 is no, the computer goes back to step 447.

Once the computer has qualified a donee or institution, it goes to step 450 to ask if this is the last account the consumer wishes to add. If not, the process goes back to step 444. If yes, the computer cancels all prior allocations in step 454 and in step 457 sequentially lists all remaining and new accounts showing the old allocations where applicable. In step 460 it asks the consumer to enter a new percentage allocation for each account. As a check, in step 464, the computer asks if the total percentages exceed 100%. If yes, it returns to step 460 for a new entry. If not, it proceeds to step 467 to ask if this is the last account. If not, it goes to step 470 to ask the consumer to go to the next account and returns to step 460. If yes, the computer goes to step 474 where it asks if the total percentage is 100%. If not, the computer places the remaining percentage in a consumer's personal default account and asks the consumer to select accounts and change allocations in step 477. The computer in step 480 ends the process and prints out the results.

(2.) Referring now to calculating the additional amount by predetermined data, referred to as the rounder system, FIG. 7A is a block design that describes the invention's four level rounder system that will allow consumers to create excess funds when they make exact payments for services or goods using checks, credit, or debit drafts.

Figure 7:
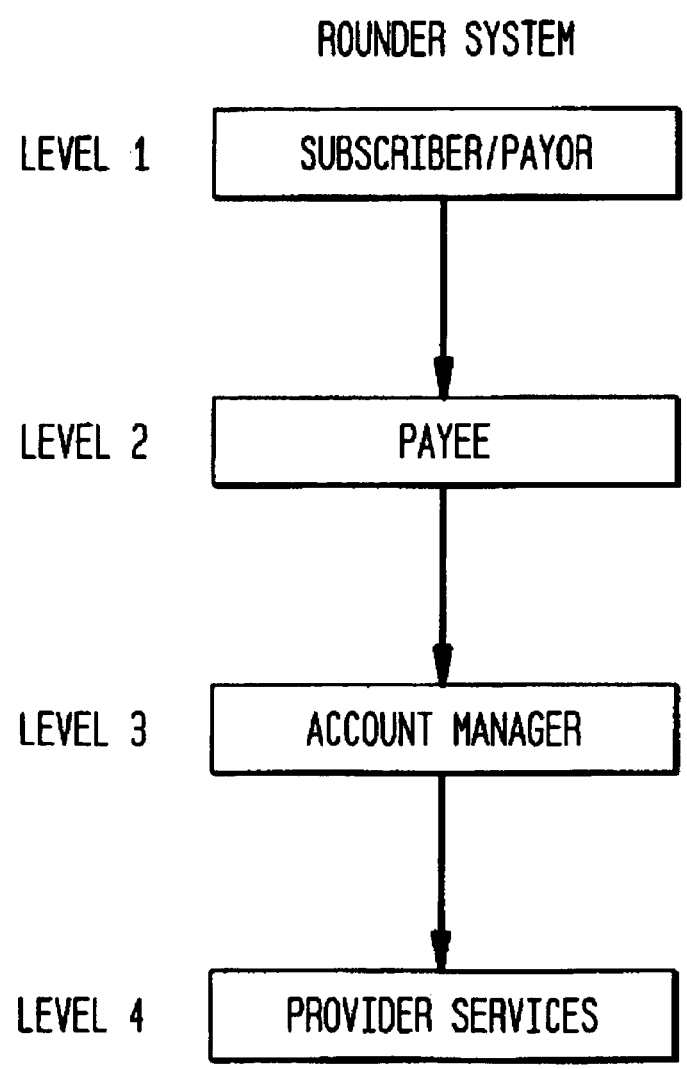
FIG. 7 is a block diagram of the rounder system embodying features of the invention.

In FIG. 7 Level 1 a subscriber (SP) makes an exact payment using a check, credit or debit card and tenders the draft to a payee on Level 2 who in turn deposits the draft for customary authorization, approval, and payment by Level 3 Account Managers (AM) (as in banks or credit institutions). Under the provisions of the invention Level 3 AM will now also add or subtract a predetermined calculation to the face amount of the draft or the account entry itself for the purpose of creating an excess payment. The amount of excess payment called a rounder amount is then added to the face amount of the draft and the total number is then debited (as in withdrawals or account fees) or added (as in deposits or interest payments) to the account balance. Level 3 AM will then manage the funds and make distributions to Provider Services (PS) Level 4 (as in mutual funds, annuities, etc.).

The rounder system embodiment of the invention creates excess funds from exact payments and without the cooperation or even awareness of the payee who accepts payments for the purchase of services or goods. The system is based on the ability to create excess funds by applying a determinant to the face amount or number of account entries, e.g. checks, ATM withdrawals, credit and debit drafts.

The rounder system versus the POS system occurs in a different environment and at a different point in the commercial purchasing cycle. The processing of transactions occurs at the "back end" of the commercial cycle when check and credit drafts are debited against their existing account balances. Effectively, the invention adds (as in withdrawals or account fees) or subtracts (as in deposits/payments or interest dividends) an amount of excess funds, e.g. $1, $2.14, $5.01, $10, $0.28, etc., to the face amount or number of entries and then adjusts the account balance accordingly. The amount of excess funds are then displayed in the account and periodically transferred to accounts for provider services, i.e., mutual funds, annuities, merchandise, charities, etc.

Under this system the SP opens up a new account or updates an existing account, e.g. checking, credit, or debit account, and instructs the bank or credit card issuer to add or subtract a determinant to each transaction after they are returned to the bank or credit issuer for final debiting against the consumer's account.

The excess funds that are created by the rounder system can be held internally by the bank or credit institution or assigned to other providers for the purchase of mutual funds, annuities, bonds, travel services, merchandise, etc.

When consumers use the above described improved methods to create excess funds from spending transactions in a combined form, they will have achieved the ability to save every time they spend, regardless of whether they use cash, write a check, use an ATM machine, use a credit or debit card.

Figure 8:
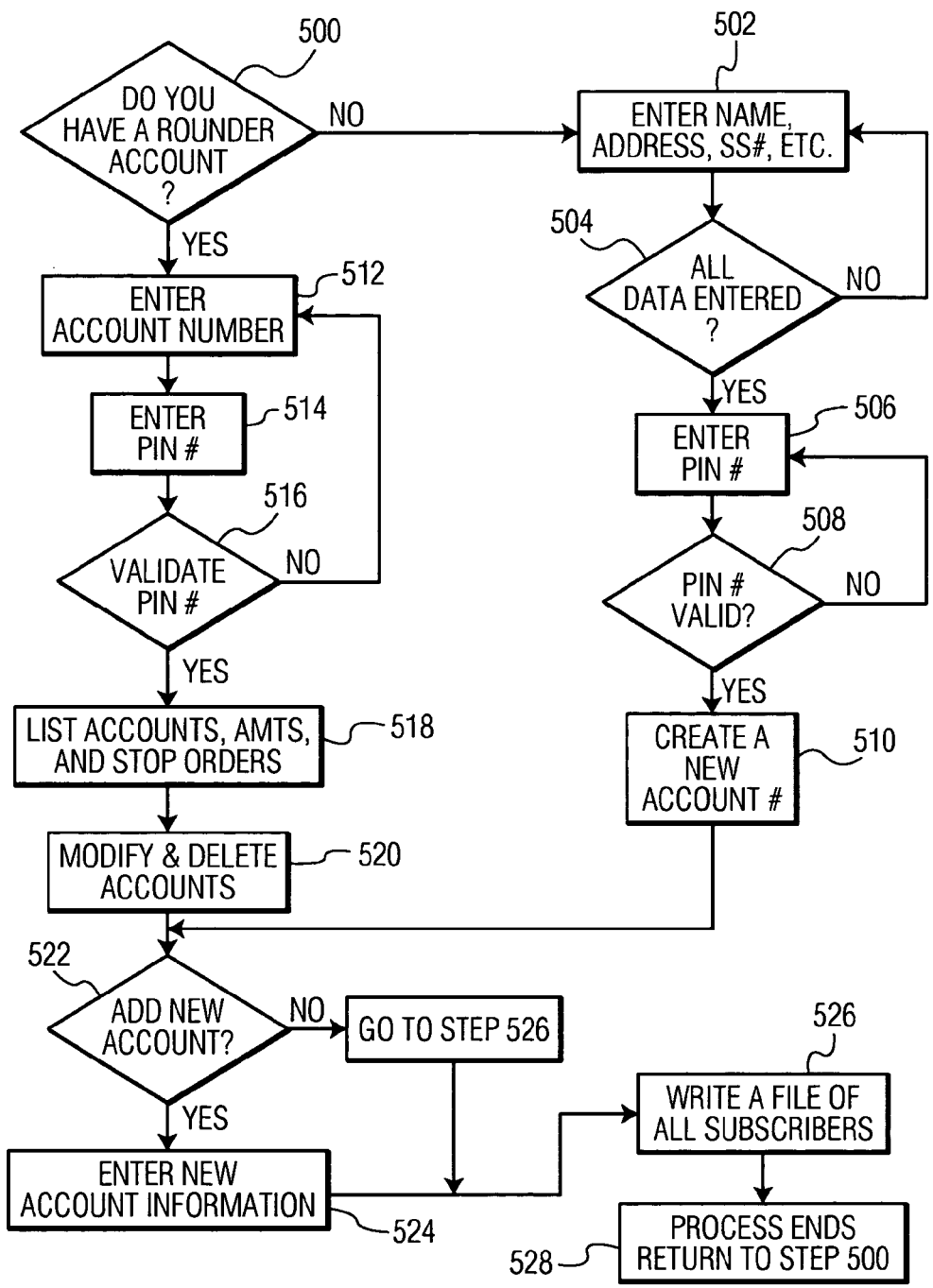
FIG. 8 is a flow chart of the steps that take place to enroll subscriber s in the rounder system shown in FIG. 7.

Referring now to FIG. 8, there is a flow chart which illustrates the steps which central computers take, through a keypad and display, to open or revise a rounder account. The subscriber/subscriber's account instructions will then be applied by the institutions' central computers (CC) to create the excess funds.

In step 500 the CC asks the consumer if you have a rounder account.

If no, in step 502 the CC asks the consumer to enter his or her name, address, social security number, select a pin number, as well as any other vital information needed to open an account.

In step 504 the CC determines if all the needed information has been entered. If not, it returns to step 502 to ask again for the desired information. If yes, the CC proceeds to step 506 to input the consumer's PIN number or code name. In step 508 the CC determines if the PIN number is acceptable. If not, it returns to step 506 for another number.

If yes, the CC advances to step 510 to assign a rounder account number. The computer then goes to step 522 to create new accounts.

If the answer in step 500 is yes, that the consumer is already a subscriber, the CC proceeds to step 512 to have the subscriber enter their rounder account number. In step 514 it asks the subscriber to enter his or her pre-selected PIN number. In step 516 it determines whether the entered PIN number matches the pre-selected PIN number for the subscriber number entered. If not, it returns to step 512 to correct the subscriber number and/or PIN number. The CC allows this procedure between steps 512 and 516 to recur only three times, thereafter it aborts the program.

If the PIN number is correct and thereby qualified, the CC in step 518 lists the rounder number or percentage that is applied to each account entry ($1, $3, 2%, etc.), stop orders (when to stop processing rounder transactions), the vehicles used for processing and depositing, e.g., checking accounts & ATM terminals, debit card use, and credit card use, names and addresses of all sub-accounts (savings, investing, and charitable choices), and the percentage of the rounder transaction assigned to each sub-account for a cumulative total of 100%. In step 520 it asks the subscriber to list all accounts to be eliminated or modified, if any.

In step 522 the CC asks the subscriber if there are any new accounts to add.

If the answer is no, the computer goes to step 526 to write an updated rounder account file. If yes, the CC then proceeds to step 524, and asks the subscriber to enter any new accounts according to the rounder number or percentage that is applied to each account entry ($1, $3, 2%, etc.), stop orders (when to stop future processing), the vehicles used for processing and depositing, (e.g., checking accounts & ATM terminals, debit card use, and credit card use), names and addresses of all sub-accounts (savings, investing, and/or three charitable choices), and the percentage of the rounder transaction assigned to each sub-account for a cumulative total of 100%.

In step 526 the computer writes a file, called the rounder account file, containing the new or revised subscriber's identification information and account instructions.

In step 528 the process ends and the computer returns to step 500.

The following information will provide clarity for the steps that will be detailed in FIG. 9A-E and FIG. 10A-E.

The face or entry amount means the actual amount of the check/ATM withdrawal or credit/debit card charges prior to any rounder activity.

The rounder transaction is the numerical function applied against the face amount or the entry itself, i.e., $1.00, $3.00, 2%, or a specific number $1.50 to create excess funds. In the preferred embodiment this will be a whole dollar amount such as $1.00, $5.00, $10.00, etc. added to the entry.

The coin amount is the presence of coins in the face amount, i.e. check for $10.14.

The rounder amount is the amount of excess funds produced by applying the rounder transaction to the entry minus the coin amount, i.e. $10.14 using a $1.00 rounder will produce $0.86 as the rounder amount of excess funds.

The total withdrawal will be the rounder amount plus the entry amount which will be debited against the checking account or credit card balance to determine the new account balance.

Referring now to FIG. 9A-E, there is a flow chart which illustrates the steps which bank central computers take, through a keypad and display, to collect funds, manage funds internally and to disburse funds.

Figure 9A:
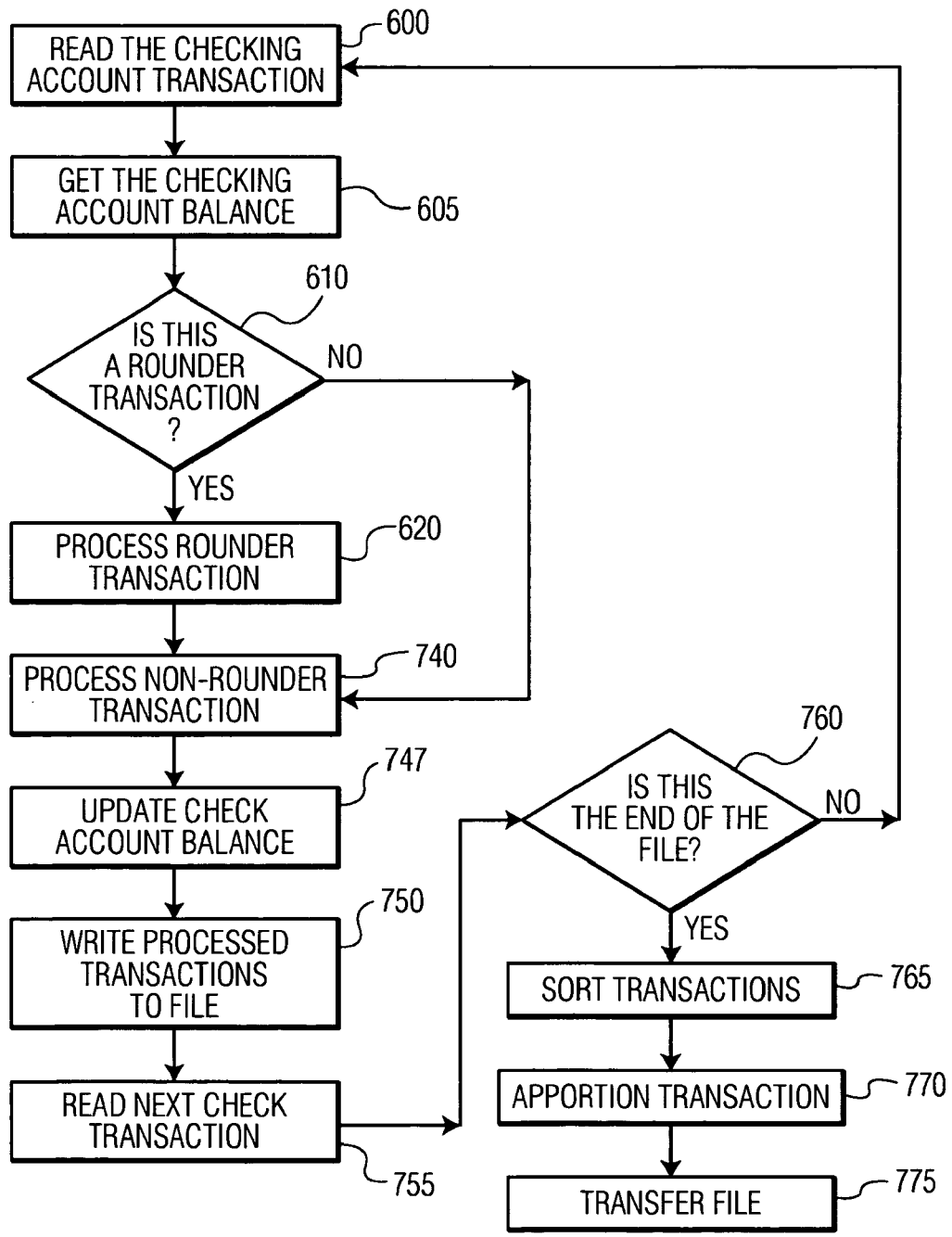
FIG. 9A-E is a flow chart of the data processing methodology used in the terminals and central computers operated by banks to process rounder transactions in FIGS. 7A&B.

Beginning at the top of FIG. 9A the bank first transmits to the CC, assigned to the clearing and reconciling of checking accounts, all transactional information and directions for rounder account processing.

In step 600 the checking account transaction is read. The transaction can be a check draft, an ATM withdrawal, checking account fee, an interest payment, etc.

In step 605 the computer gets the checking account balance.

In step 610 the computer asks, Is this account a rounder account subscriber?

If the answer is yes, in step 620 the transactions are processed according to rounder transaction instructions.

Figure 9B:
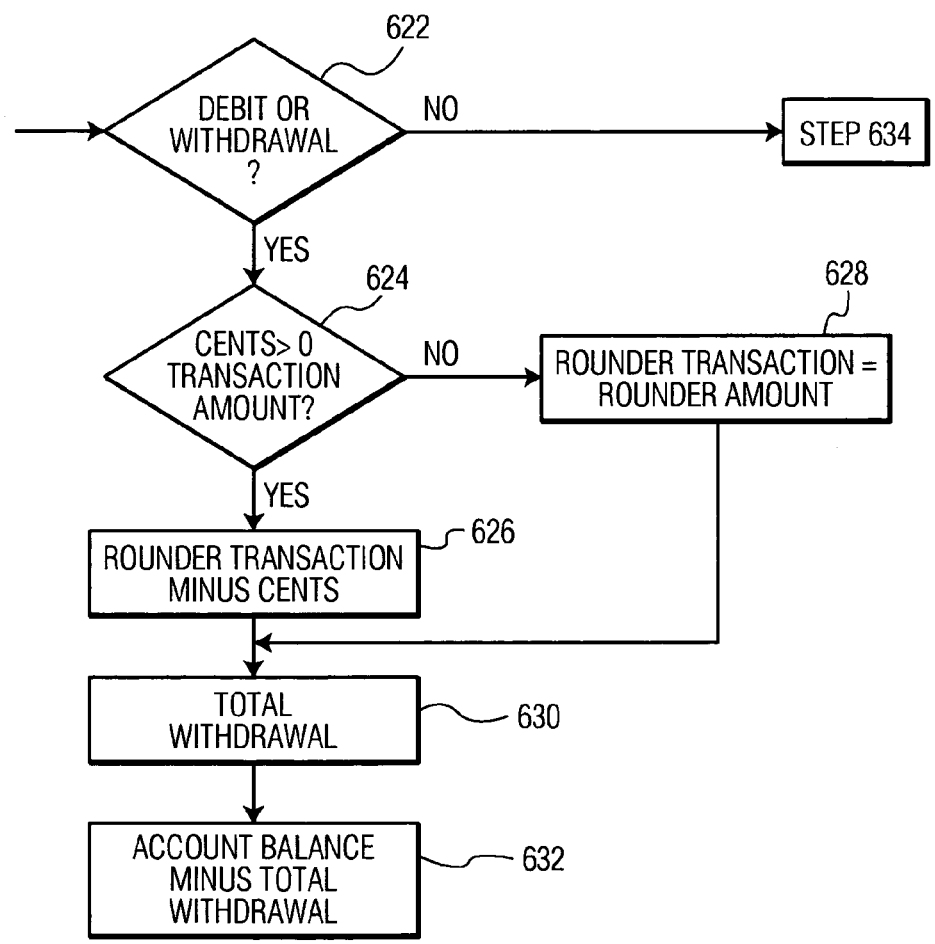
Figure 9C:
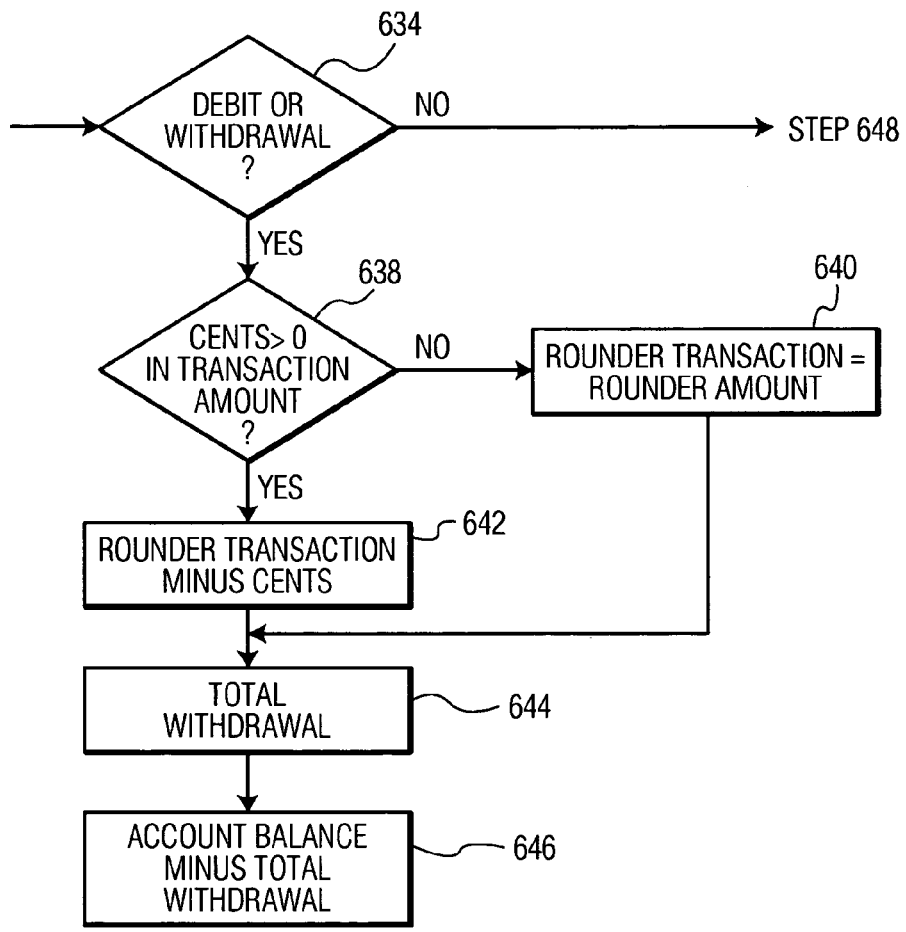
Figure 9D:
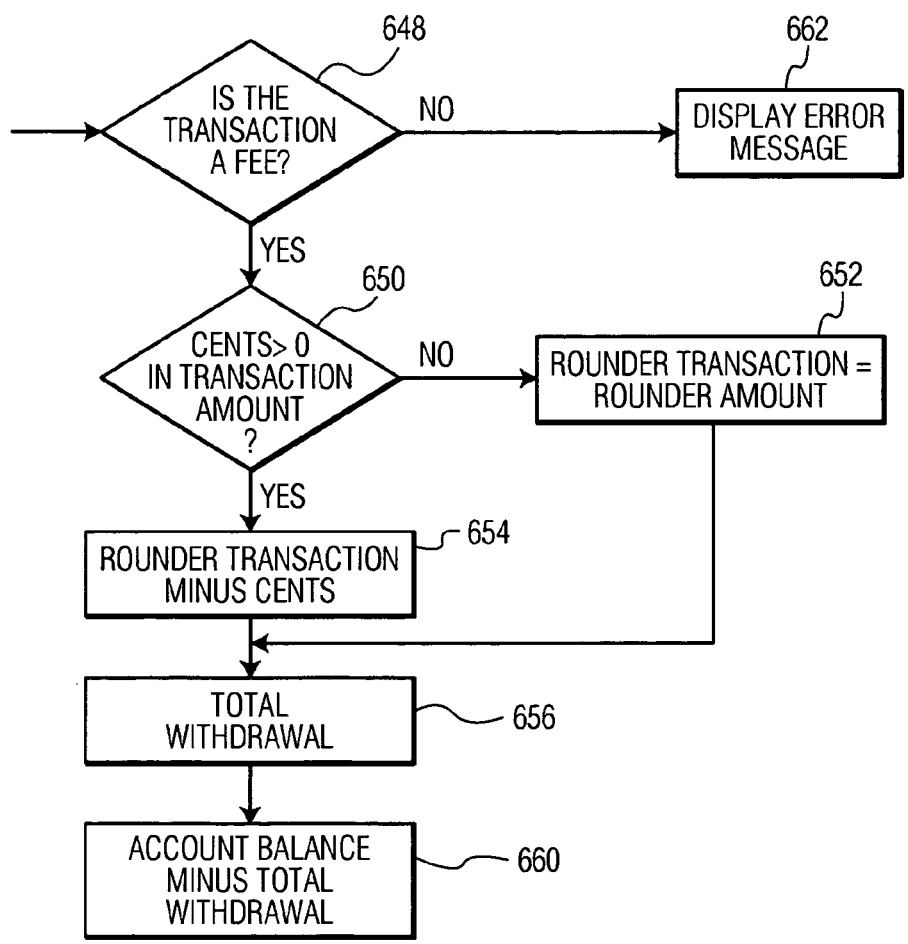
Figure 9E:
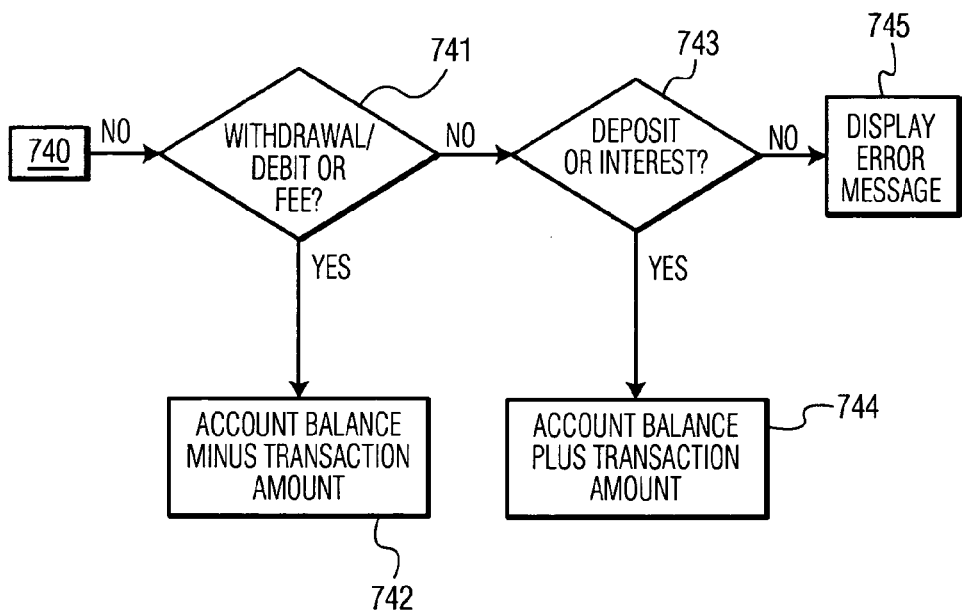

If the answer is no, in step 740 the transactions are processed without the rounder transaction instructions (See FIG. 9E).

In step 747 basic account balances are updated.

In step 750 the computer writes processed transactions to file.

In step 755 the computer reads next checking transaction.

In step 760 the computer asks, Is this the end of the file? If the answer is yes, computer goes to step 765. If the answer is no, computer goes to step 600.

In step 765 the computer sorts all transactions.

In step 770 the computer apportions rounder account contributions per account instructions contained in step 526, the rounder account file.

In step 775 the computer transfers out the charity contributions, saving s, investments, and other accounts.

The computer processing required to create rounder account contributions is detailed in FIG. 9B. Starting at the top, in step 622 the computer asks, Is this transaction a debit or withdrawal?

If the answer is no, computer goes to step 634. If the answer is yes, computer asks in step 624, In the transaction are the cents greater than zero cents?

The following will assume the application of a $1.00 rounder transaction.

If the answer is no, in step 628 the rounder transaction would equal the rounder amount. For example if the rounder transaction is $1.00, to be added to the entry amount of a $10.00 withdrawal, the rounder amount of $1.00 will be created as excess funds for the rounder account and the total withdrawal will be $11.00.

If the answer is yes, in step 626 the cents in the purchase price will be subtracted from the rounder transaction and the net difference will become the rounder amount which will then be deposited into the rounder account. For example if the purchase price was $10.14 cents and $1.00 was the rounder transaction $0.14 would be subtracted from the $1.00 and the net of $0.86 would be the rounder amount which would then be deposited into the rounder account. The total withdrawal would still be $11.00.

In step 630 the rounder amount and the entry amount are added together to determine the total withdrawal.

In step 632 the total withdrawal is then subtracted from the existing balance to determine the new balance.

The detailed computer processing required to create rounder account contributions is continued in FIG. 9C in regard to deposits or fee income.

In the processing of deposits or interest into accounts we reverse the process and decrement the amount of money going into the checking account so that we can create excess funds. Therefore, we can apply similar rules, as previously discussed, when the invention dealt with account withdrawals, but only in a decrementing fashion.

In the preferred embodiment we will decrement deposits and interest payments only to eliminate coin amounts.

Starting at the top, in step 634 the computer asks, Is this transaction a deposit or interest fee?

If the answer is no, the computer goes to step 648.

If the answer is yes, the computer asks in step 638, In the transaction are the cents greater than zero cents?

If the answer is no, in step 640 the rounder account contribution equals zero since there are no coins in the entry amount of the deposit. The program then goes to step 644.

If the answer is yes, in step 642 the cents are subtracted from the face amount and the coins become rounder contributions. For example, if the deposit was for $10.14 the rounder would take off the $0.14 and the net deposit would be for $10.00.

In step 644 the rounder amount is subtracted from the face amount to determine the total deposit.

In step 646 the total deposit is then added to the existing balance to determine the new balance.

The ability for the invention to remove coins from checking account deposits will allow for easier balancing of checking accounts.

The detailed computer processing required to create rounder amounts is continued in FIG. 9D when the transaction is a fee.

The rules applied here are the same as in processing withdrawals. But again for the preferred embodiment, which will follow, the process will only be applied to the presence of coin amounts in fee charges.

Starting at the top, in step 648 the computer asks, Is this a fee?

If the answer is no, the computer goes to step 662.

If the answer is yes, the computer asks in step 650, In the transaction are the cents greater than zero cents?

If the answer is no, in step 652 the rounder account contribution equals zero since there are no coins in the face amount of the fee. The program then goes to step 656.

If the answer is yes, in step 654 the cents are added to the face amount and the coins become the rounder amount. For example, if the fee was for $10.14 a one dollar rounder add another $0.86 and the net withdrawal would be for $11.00.

In step 656 the rounder amount is added to the face amount to determine the total withdrawal.

In step 660 the total withdrawal is then subtracted from the existing balance to determine the new balance.

The ability for the invention to remove coins from checking account fees will allow for easier balancing of checking accounts.

The computer steps required to process non-rounder account transactions are detailed in FIG. 9E. Starting at the top, in step 741 the computer asks, Is this transaction a debit, withdrawal, or fee?

If the answer is yes, in step 742, the checking account balance is determined by subtracting the transaction amount from the account balance.

If the answer is no, computer goes to step 743 and asks, Is this transaction a deposit or interest?

If the answer is yes, in step 744 the checking account balance is determined by subtracting the transaction amount from the account balance.

If the answer is no, the computer in step 745 displays error message.

Referring now to FIG. 10A-E, there is a flow chart which illustrates the steps which card issuers central computers take, through a keypad and display, to collect funds, manage funds internally and to disburse funds.

Figure 10A:
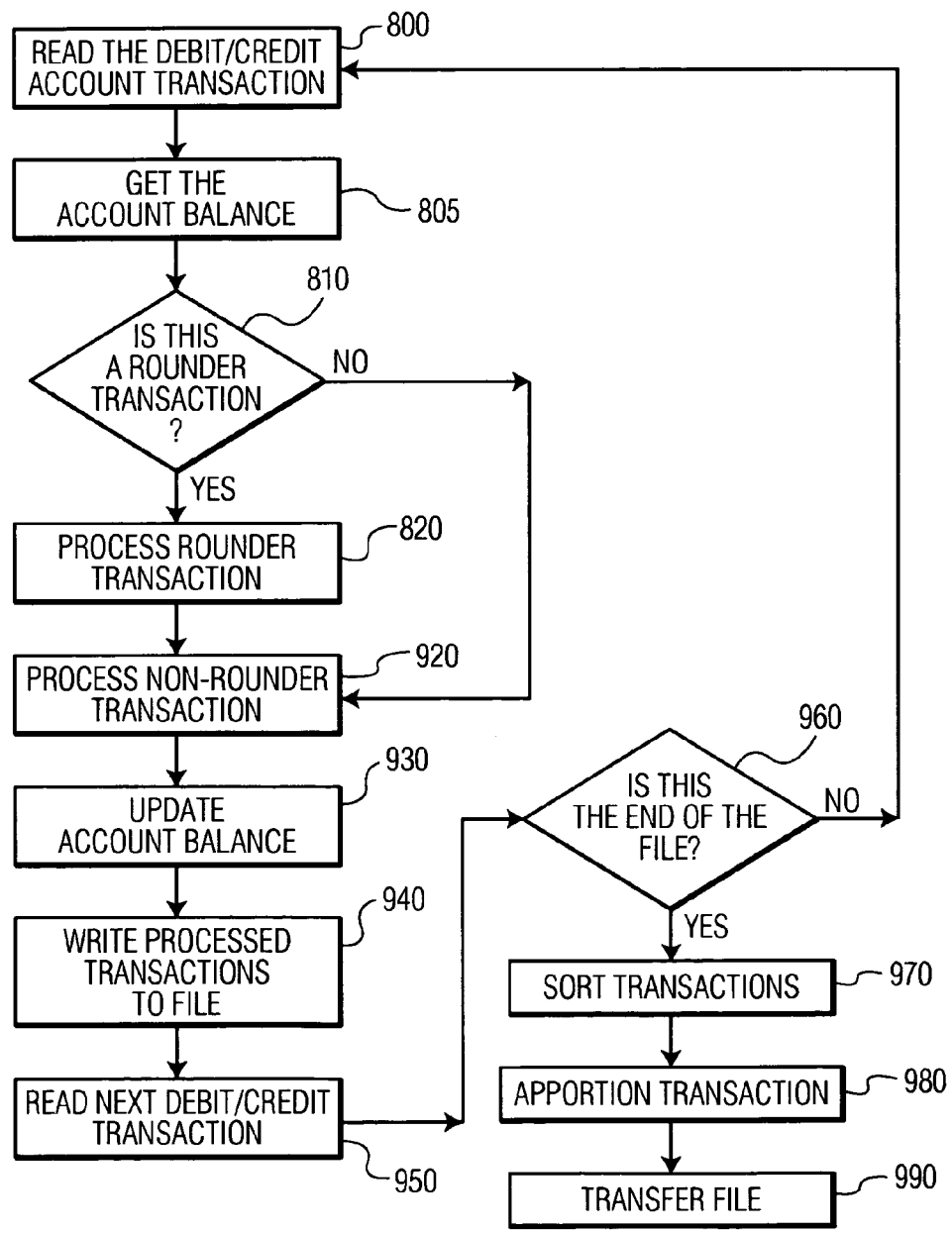
FIG. 10A-E is a flow chart of the data processing methodology used in the terminals and central computers operated by banks and credit institutions to process rounder transactions in FIGS. 7A&B.

Beginning at the top of FIG. 10A, the card issuers first transmit to the CC used in clearing and reconciling debit and credit card accounts all transactional information of the subscribers who round up or down their debit/credit card transactions. This information has been obtained, see FIG. 8, through the enrollment process.

In step 800 the debit/credit account transaction is read. The transaction can be a debit/credit charge processed through a POS terminal, filled in by hand, called in over the telephone, etc.

In step 805 the computer gets the cardholder's account balance.

In step 810 the computer asks, Is this account a rounder account subscriber?

If the answer is yes, in step 820 the transactions are processed according to rounder instructions.

If the answer is no, in step 920 the transactions are processed without the rounder instructions.

In step 930 the account balances are updated.

In step 940 the computer writes processed transaction to file.

In step 950 the computer reads next debit/credit card transaction.

In step 960 the computer asks, Is this the end of the file? If the answer is yes, computer goes to step 970. If the answer is no, computer goes to step 800.

In step 970 the computer sorts all transactions.

In step 980 the computer apportions rounder account contributions per account instructions contained in step 526 of the rounder account file.

In step 990 the computer transfers out the charity contributions, saving s, investments, and other accounts.

Figure 10B:
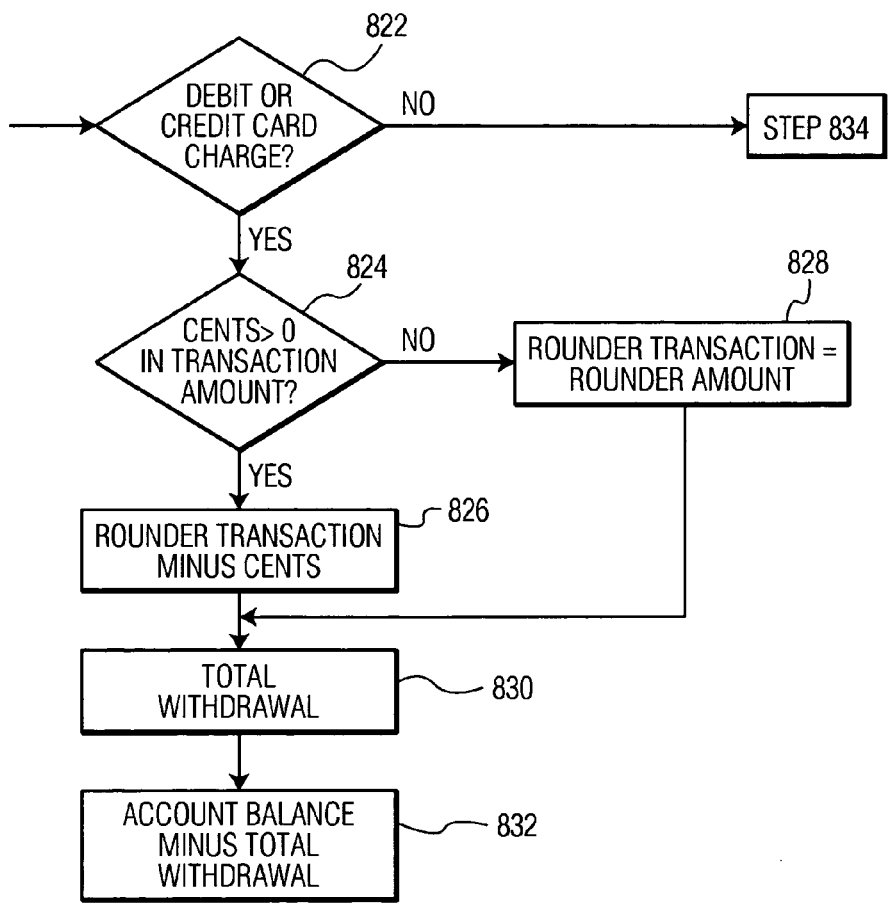

The computer processing required to create rounder transaction contributions is detailed in FIG. 10B. Starting at the top, in step 822 the computer asks, Is this transaction a debit or credit card charge?

If the answer is no, the computer goes to step 834. If the answer is yes, the computer asks in step 824, In the transaction are the cents greater than zero cents?

If the answer is no, in step 828 the rounder transaction would equal the rounder amount. The computer then goes to step 830. For example, if the rounder transaction is $1.00, to be added to the entry amount of the credit charge of say $300.00, the rounder amount of $1.00 will be created as excess funds for the rounder account and the total charge will be $301.00.

If the answer is yes, in step 826 the cents in the charged amount will be subtracted from the rounder transaction and the net difference will become the rounder amount which will then be deposited into the rounder account. For example if the credit charge was 2 $300.14 cents and $1.00 was the rounder transaction $0.14 would be subtracted from the $1.00 and the net of $0.86 would be the rounder amount which would then be deposited into the rounder account. The total charge would still be $301.00 In step 830 the rounder amount and the entry amount are added together to determine the total charge.

In step 832 the total withdrawal is then subtracted from the existing balance to determine the new balance.

Figure 10C:
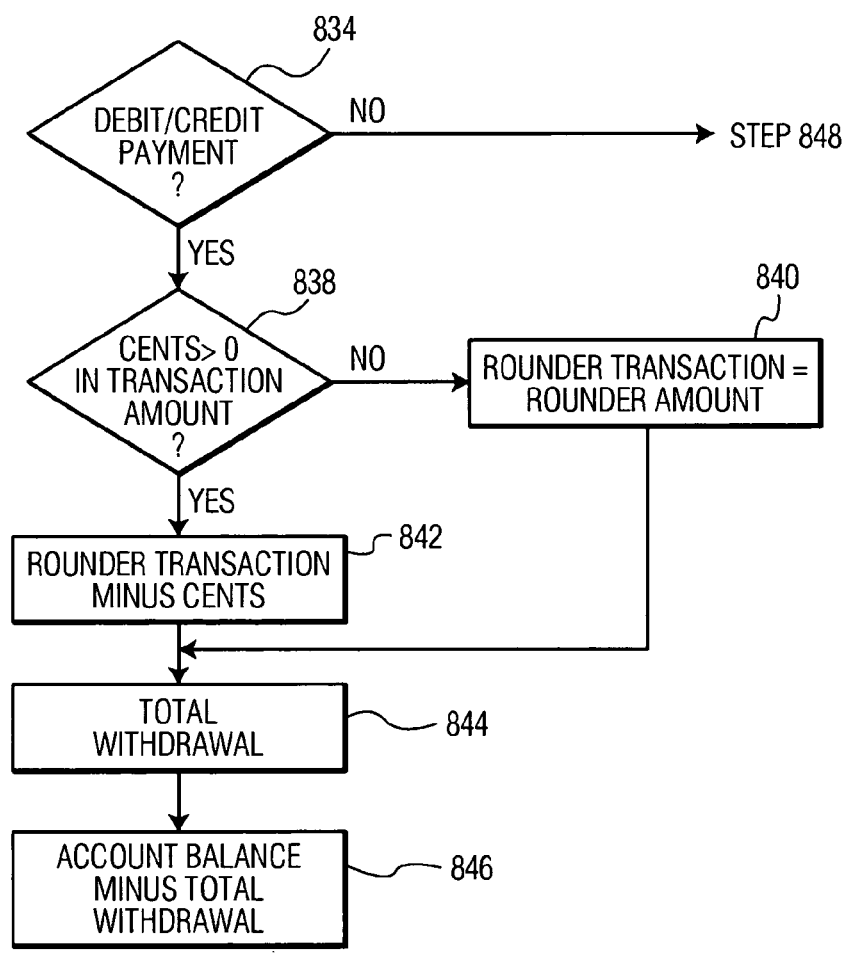

The detailed computer processing required to create rounder account contributions is continued in FIG. 10C in regard to account payments or interest dividends. In the processing of payments into accounts we reverse the process and decrement the amount of money going into the account so that we can create excess funds. Therefore we can apply similar rules, as previously discussed when the invention dealt with account withdrawals, but only in a decrementing fashion.

In the preferred embodiment, the invention will only decrement payments when coins are present.

Starting at the top, in step 834 the computer asks, Is this transaction a payment or interest dividend?

If the answer is no, computer goes to step 848. If the answer is yes, computer asks in step 838, In the transaction are the cents greater than zero cents? If the answer is no, in step 840 the rounder account contribution equals zero since there are not any coins in the entry amount of the deposit. The computer then goes to step 844.

If the answer is yes, in step 842 the cents are subtracted from the entry amount and the coins become rounder contributions. For example if the payment was for $500.14, the rounder would take off the $0.14 and the net deposit would be for $500.00.

In step 844 the rounder amount is subtracted from the entry amount to determine the total payment. In step 846 the total withdrawal is then subtracted from the existing balance to determine the new balance.

Figure 10D:
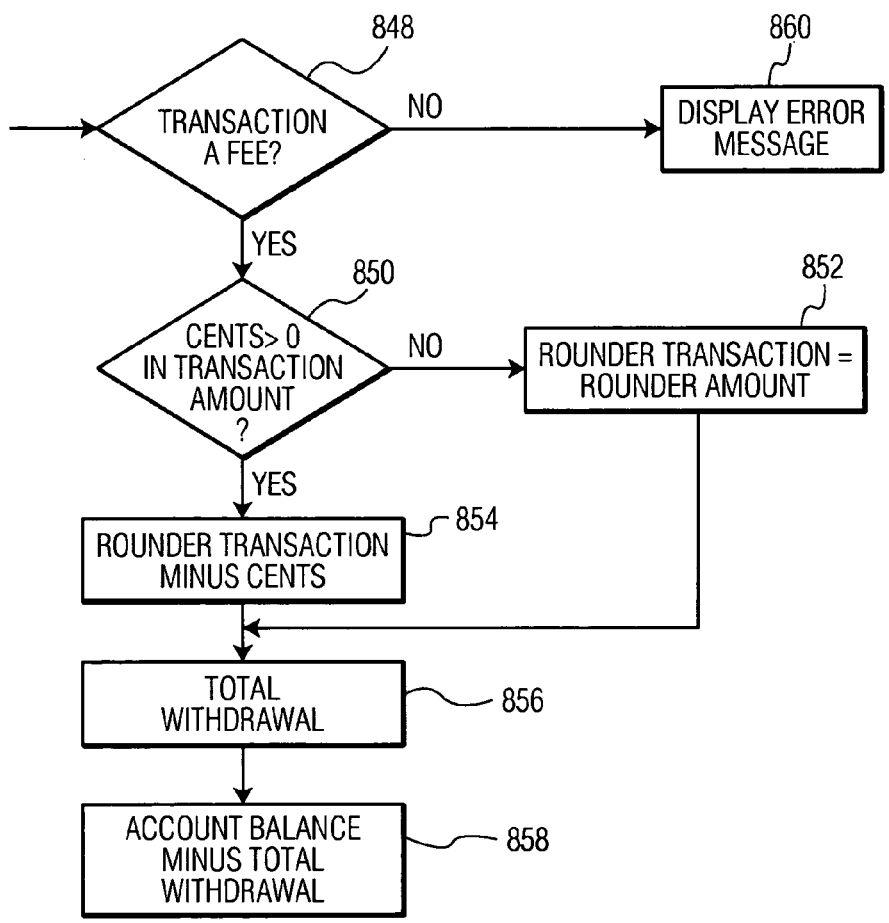

The detailed computer processing required to create rounder amounts is continued in FIG. 10D when the transaction is a fee.

The rules applied here are the same as in processing withdrawals. But again for the preferred embodiment, which will follow, the process will only be applied to the presence of coin amounts in fee charges.

Starting at the top, in step 848 the computer asks, Is this a fee?

If the answer is no, computer goes to step 860. If the answer is yes, computer asks in step 850, In the transaction are the cents greater than zero cents?

If the answer is no, in step 852 the rounder account contribution equals zero since there are not any coins in the face amount of the fee. The computer then goes to step 856.

If the answer is yes, in step 854 the cents are added to the entry amount and the coins become the rounder amount. For example if the fee was for $10.14 and a one dollar rounder, add another $0.86 and the net withdrawal would be for $11.00.

In step 856 the rounder amount is added to the entry amount to determine the total withdrawal.

In step 858 the total withdrawal is then subtracted from the existing balance to determine the new balance.

Figure 10E:
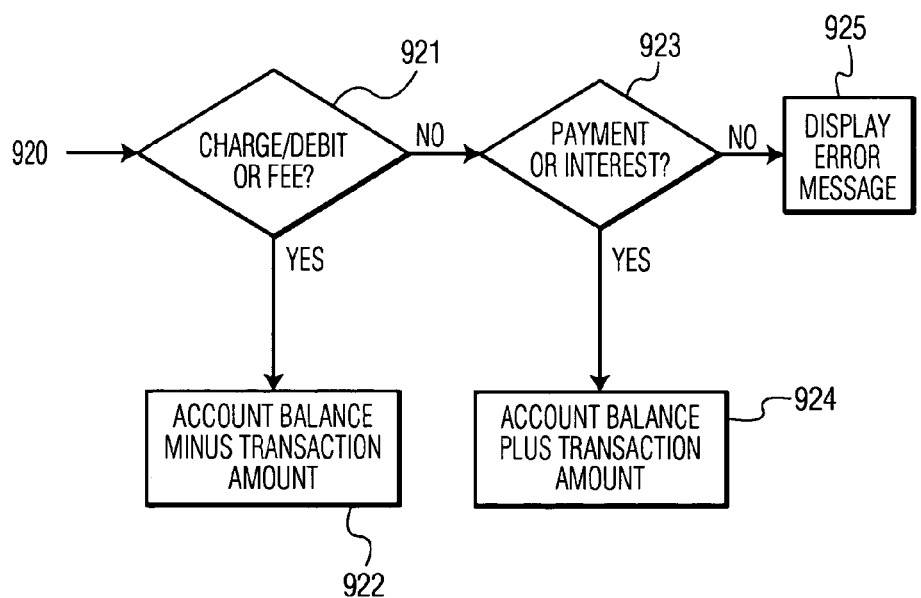

The computer steps required to process non-rounder account transactions are detailed in FIG. 10E. Starting at the top, in step 921 the computer asks, Is this transaction a charge or fee?

If the answer is yes, in step 922, the credit balance is determined by subtracting the transaction amount from the account balance.

If the answer is no, the computer goes to step 923 and asks, Is this transaction a payment or interest dividend?

If the answer is yes, in step 924 the credit account balance is determined by subtracting the transaction amount from the account balance.

If the answer is no, the computer in step 925 displays error message. The invention provides a unique and presently unavailable way for consumers to save every time they spend, regardless of whether they use cash, write a check, use an ATM machine, use a credit or debit card.

The invention provides an "open" POS system whereupon consumers can make excess payments at point of sale counters and have the excess funds be put in special accounts. The "open" system for making excess payments will comprise a four level network utilized in combination with consumers referred to as subscriber/subscribers (SP), payees referred to as merchant/collectors (MC), a central computer/clearinghouse/network (CCC), and provider accounts (PA). The POS system will allow SP the ability to create excess funds from the overpayment of spending transactions using cash, check, credit, or debit card, at POS counters and have said excess overpayments be transferred through a CCC onto provider accounts selected by said subscriber/subscribers (SP).

The invention also provides a four level rounder system (RS) for subscriber/subscribers to create excess funds from account entries connected with transactions paid for by check, ATM machine, credit, or debit card (which can occur at a variety of commercial points: POS counters, on a person to person basis, by mail, by wire transfer, by telephone, by computer, etc.). The rounder system would apply a computerized rounder amount to create excess funds in which the active cooperation of the payee is not needed and when the face amount of the payment being tendered is not in excess of the actual purchase price as the required means to establish the excess funds.

While embodiments of the invention have been described in detail, it will be evident to those skilled in the art that the invention may be embodied otherwise without departing from its spirit and scope. Therefore, the following claims are meant to encompass all alternatives and modifications within the scope and spirit of the present invention.

The invention claimed is:

1. A system for accumulating credits from a customer account belonging to the customer and managed by an institution and placing the credits into a provider account, comprising:
   an information processor; said information processor including a data store with data identifying the customer, the rounding determinant, the managed institution, and the account;
   said data store including machine readable instructions authorizing the processor to access and read the customer account;
   said data store including machine readable instructions to calculate rounders after receiving a plurality of payment transactions from the read customer account and to calculate an excess based on the rounders;
   said data store including machine readable instructions to withdraw the excess from the customer account;
   said data store including machine readable instructions to transfer the withdrawn excess to the provider account.

2. A system as in claim 1, wherein said information processor includes a communicator coupled to a communication network connected to the customer, the institution, and the account.

3. A system as in claim 1, wherein said data store includes data from a plurality of customers, a plurality of institutions, and a plurality of accounts.

4. A system as in claim 1, wherein said information processor is a service organization for handling data from a number of customers, institutions, and accounts.

* * * * *